US012078337B2

(12) United States Patent
Wald et al.

(10) Patent No.: US 12,078,337 B2
(45) **Date of Patent: *Sep. 3, 2024**

(54) ENHANCED LIGHTING

(71) Applicant: Wangs Alliance Corporation, Port Washington, NY (US)

(72) Inventors: Shelley S. Wald, Austin, TX (US); Wai Ho Choy, Mineola, NY (US); Derrick A. Wald, Austin, TX (US)

(73) Assignee: Wangs Alliance Corporation, Port Washington, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/443,623

(22) Filed: Feb. 16, 2024

(65) Prior Publication Data

US 2024/0191863 A1 Jun. 13, 2024

Related U.S. Application Data

(63) Continuation of application No. 18/136,494, filed on Apr. 19, 2023, now Pat. No. 11,906,153, which is a continuation of application No. 17/737,921, filed on May 5, 2022, now Pat. No. 11,913,634.

(60) Provisional application No. 63/326,368, filed on Apr. 1, 2022, provisional application No. 63/193,238, filed on May 26, 2021, provisional application No. 63/184,309, filed on May 5, 2021.

(51) Int. Cl.
*F21V 5/00* (2018.01)
*F21Y 115/10* (2016.01)

(52) U.S. Cl.
CPC .......... *F21V 5/002* (2013.01); *F21Y 2115/10* (2016.08)

(58) Field of Classification Search
CPC ................................ F21V 5/002; F21L 15/02
See application file for complete search history.

(56) References Cited

U.S. PATENT DOCUMENTS

| | | | | |
|---|---|---|---|---|
| 6,327,091 | B1 * | 12/2001 | Agano | G02B 5/0226 359/452 |
| 9,618,680 | B2 * | 4/2017 | Baker | G02B 5/0242 |
| 11,181,251 | B1 * | 11/2021 | Chen | F21V 23/002 |

(Continued)

OTHER PUBLICATIONS

"Pictures of Dionia Light Fixture," first sold about Jan. 13, 2017.

(Continued)

*Primary Examiner* — Christopher E Dunay
(74) *Attorney, Agent, or Firm* — Weiss & Arons LLP

(57) ABSTRACT

Apparatus and methods for enhanced lighting. The apparatus may include a light-transmitting body. The apparatus may include a light projector. The projector may be configured to propagate into the light-transmitting body an incoming incoherent light. The projector may be configured to propagate into the light-transmitting body an incoming visible coherent light. Emerging coherent light within a visible wavelength rage attributable to the incoming visible coherent light may have a first intensity. The first intensity may be greater than a second intensity. The second intensity may be an intensity of any emerging coherent light that is within the wavelength range and is attributable to the incoming incoherent light. Emerging light may be light that emerges from the light-transmitting body.

30 Claims, 31 Drawing Sheets

(56) References Cited

U.S. PATENT DOCUMENTS

| | | | | |
|---|---|---|---|---|
| 2006/0112874 | A1* | 6/2006 | Yokota | H01L 29/1602 257/E29.082 |
| 2016/0146424 | A1* | 5/2016 | Chiu | H10K 50/854 362/311.03 |
| 2017/0175973 | A1* | 6/2017 | Dai | F21V 5/002 |
| 2018/0313985 | A1* | 11/2018 | Ishimori | G02B 5/0278 |
| 2019/0104577 | A1 | 4/2019 | Miller et al. | |
| 2020/0124264 | A1* | 4/2020 | Gong | F21V 29/503 |
| 2020/0142209 | A1* | 5/2020 | Dal Negro | G02B 27/42 |
| 2021/0003768 | A1* | 1/2021 | Sechi | G02B 6/0051 |
| 2021/0009826 | A1* | 1/2021 | Kizaki | G02F 1/133617 |
| 2022/0018992 | A1* | 1/2022 | Oya | C08F 290/12 |
| 2022/0135764 | A1* | 5/2022 | Azuma | G02B 7/02 524/401 |
| 2022/0154366 | A1* | 5/2022 | Edmonds | C23C 16/56 |

OTHER PUBLICATIONS

“Pictures of Enlace Light Fixture,” first sold about Sep. 1, 2012.
“Pictures of Fenestri Light Fixture,” first sold about Apr. 8, 2013.
“Pictures of ReveaLED Light Fixture,” first sold about Apr. 12, 2011.
“Pictures of Trimini Light Fixture,” first sold about Apr. 3, 2017.
Photograph, annotated, front perspective view of Kuzco Exterior LED Lamp Wall Sconce EW53808, May 2019.
Photograph, back perspective view of Kuzco Exterior LED Lamp Wall Sconce EW53808, May 2019.
Photograph, view of Kuzco Exterior LED Lamp Wall Sconce EW53808, back plate exterior, May 2019.
Photograph, annotated, partial breakdown view of Kuzco Exterior LED Lamp Wall Sconce EW53808, May 2019.
Photograph, view of Kuzco Exterior LED Lamp Wall Sconce EW53808, back plate interior, May 2019.
Photograph, annotated, view of Kuzco Exterior LED Lamp Wall Sconce EW53808, grains, May 2019.
Photograph, view of Kuzco Exterior LED Lamp Wall Sconce EW53808, sample grains, May 2019.
Photograph, annotated, front perspective view of Kuzco Exterior LED Lamp Wall Sconce EW53808, Kuzco Lighting, May 2019.
Photograph, back perspective view of Kuzco Exterior LED Lamp Wall Sconce EW53808, Kuzco Lighting, May 2019.
Photograph, view of Kuzco Exterior LED Lamp Wall Sconce EW53808, back plate exterior, Kuzco Lighting, May 2019.
Photograph, annotated, partial breakdown view of Kuzco Exterior LED Lamp Wall Sconce EW53808, Kuzco Lighting, May 2019.
Photograph, view of Kuzco Exterior LED Lamp Wall Sconce EW53808, back plate interior, Kuzco Lighting, May 2019.
Photograph, annotated, view of Kuzco Exterior LED Lamp Wall Sconce EW53808, grains, Kuzco Lighting, May 2019.
Photograph, view of Kuzco Exterior LED Lamp Wall Sconce EW53808, sample grains, Kuzco Lighting, May 2019.

* cited by examiner

ENHANCED LIGHTING

This is a continuation of co-pending U.S. patent application Ser. No. 18/136,494, filed Apr. 19, 2023, which is a continuation of co-pending U.S. patent application Ser. No. 17/737,921, filed May 5, 2021, which is a nonprovisional of U.S. Provisional Application Nos. 63/184,309, filed May 5, 2021, 63/193,238 filed May 26, 202, and 63/326,368 filed on Apr. 1, 2022, all of which are hereby incorporated by reference in their entireties.

BACKGROUND

Decorative lighting typically relies upon color separation of white light by highly refractive materials. Highly refractive materials may be expensive and may require extensive preparation for use in the decorative lighting. Less-refractive materials may be less expensive to acquire and process, but their lack of refractive capability makes them less desirable for lighting.

It would therefore be desirable to provide apparatus and methods for enhanced lighting.

BRIEF DESCRIPTIONS OF THE DRAWINGS

The objects and advantages of the invention will be apparent upon consideration of the following detailed description, taken in conjunction with the accompanying drawings, in which like reference characters refer to like parts throughout, and in which.

Figure 24:
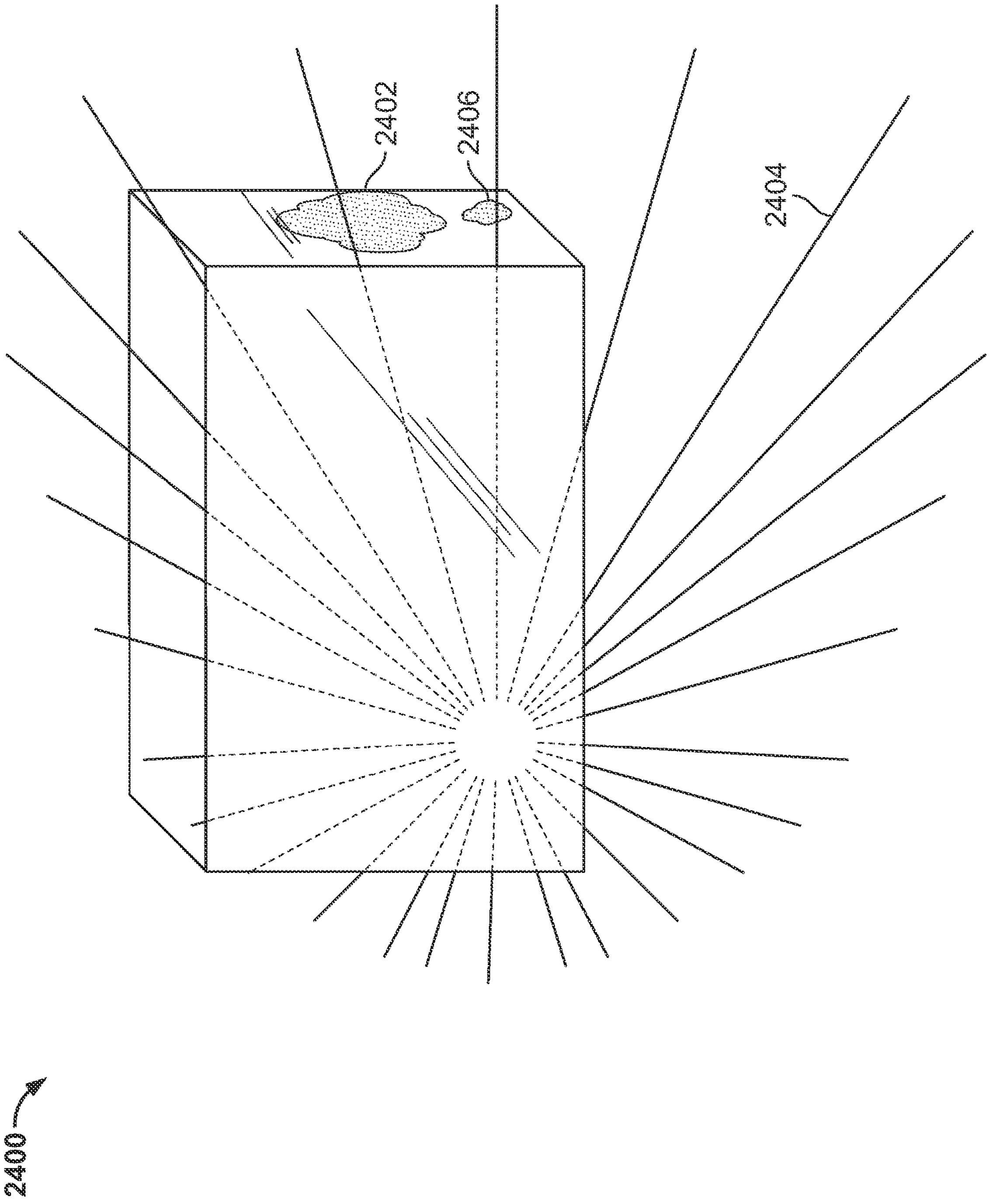
FIG. 24 shows schematically illustrative apparatus in accordance with principles of the invention.
Figure 24A:
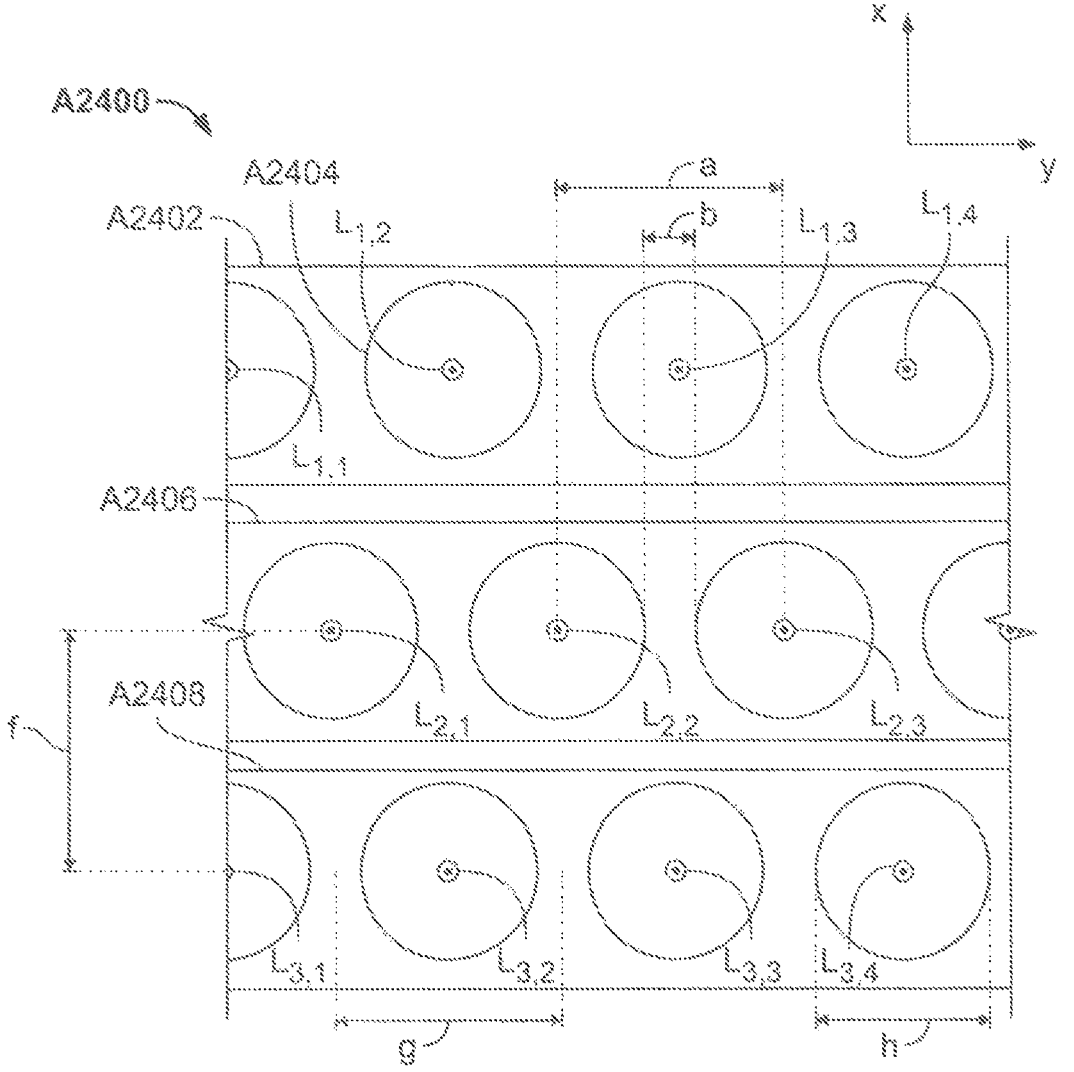

FIG. 24*a* shows schematically illustrative apparatus in accordance with principles of the invention.

Figure 25:
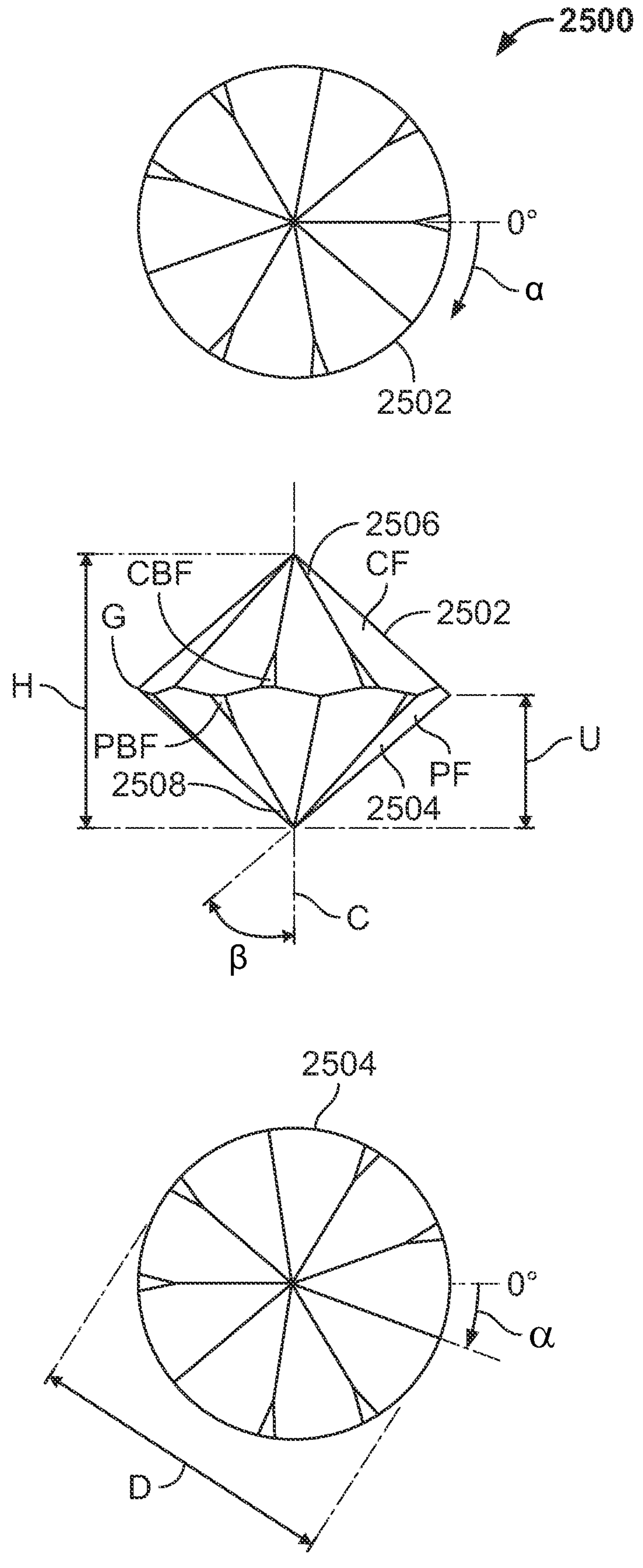

FIG. 25 shows schematically illustrative apparatus in accordance with principles of the invention.

Figures 26, 27, 27A:
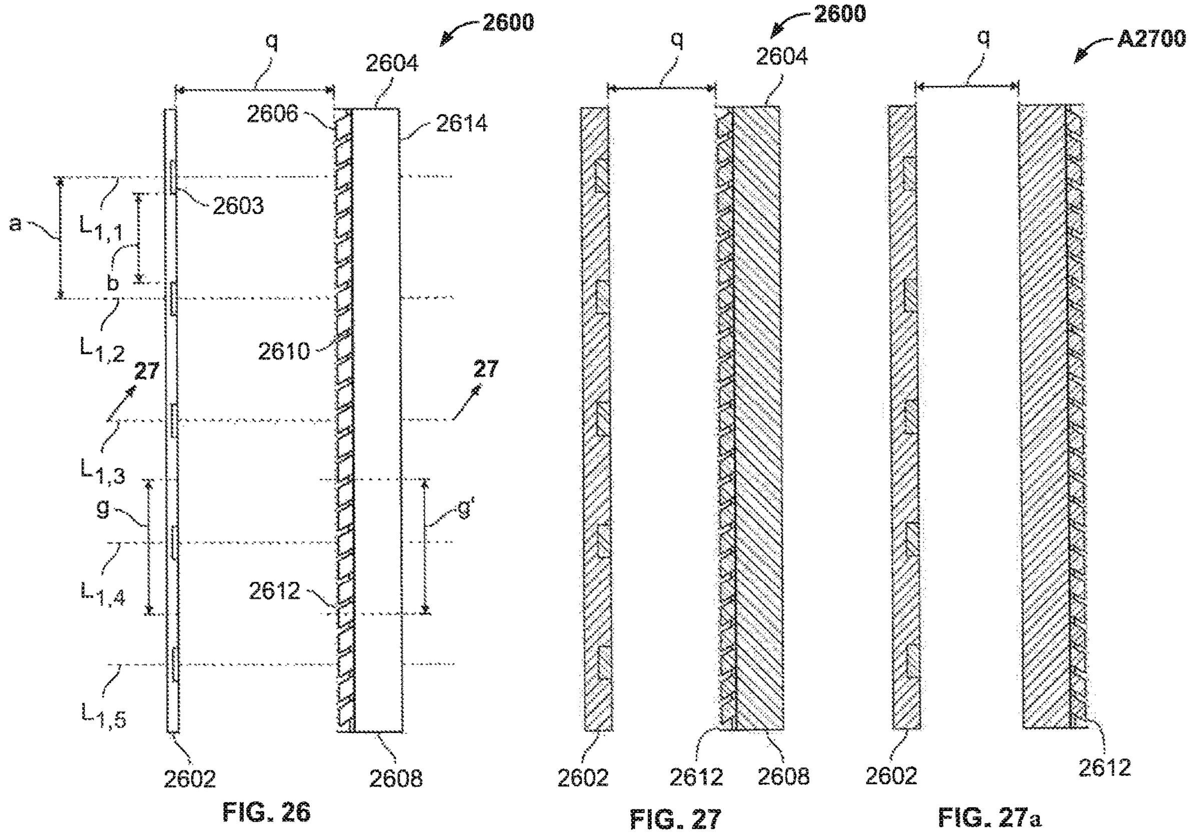

FIG. 26 shows schematically illustrative apparatus in accordance with principles of the invention.

FIG. 27 shows schematically illustrative apparatus in accordance with principles of the invention.

FIG. 27*a* shows schematically illustrative apparatus in accordance with principles of the invention.

Figure 28:
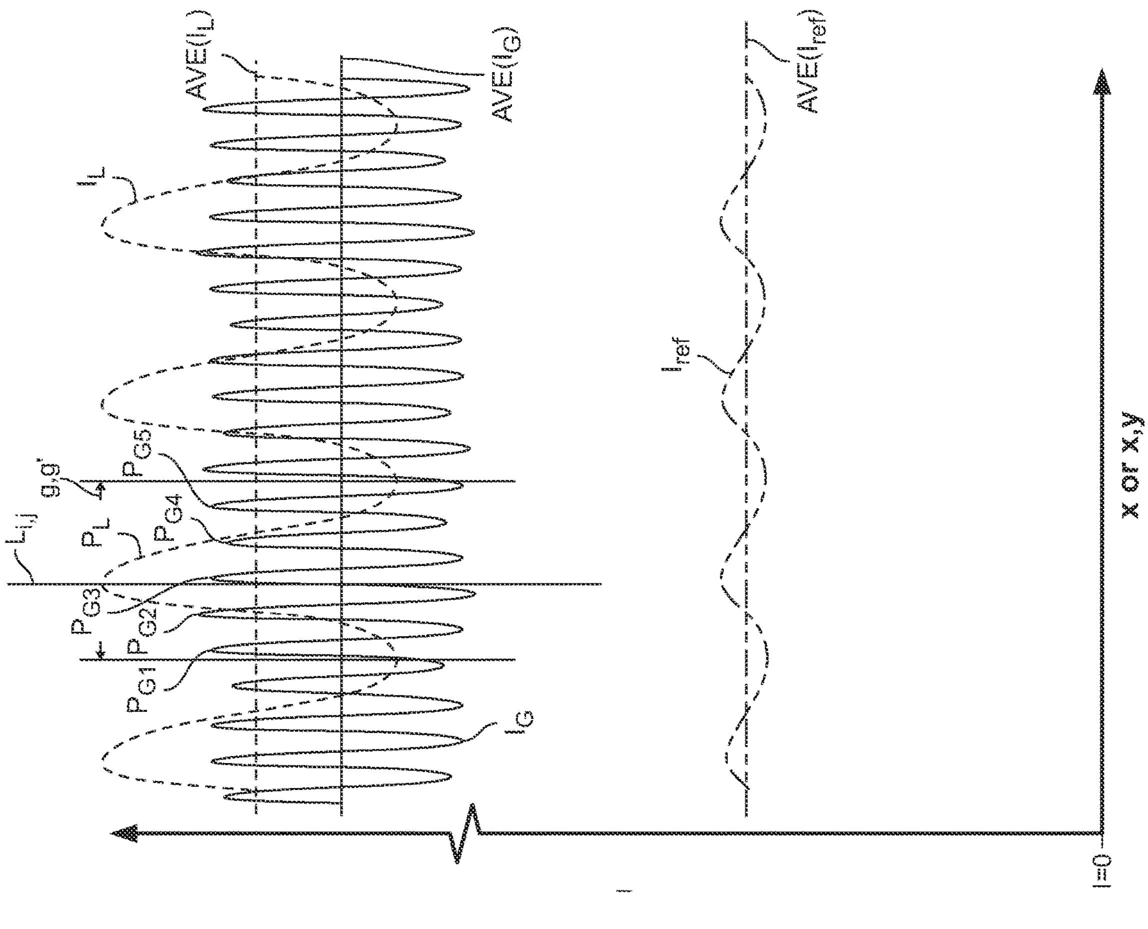

FIG. 28 shows schematically illustrative information in accordance with principles of the invention.

Figure 29:
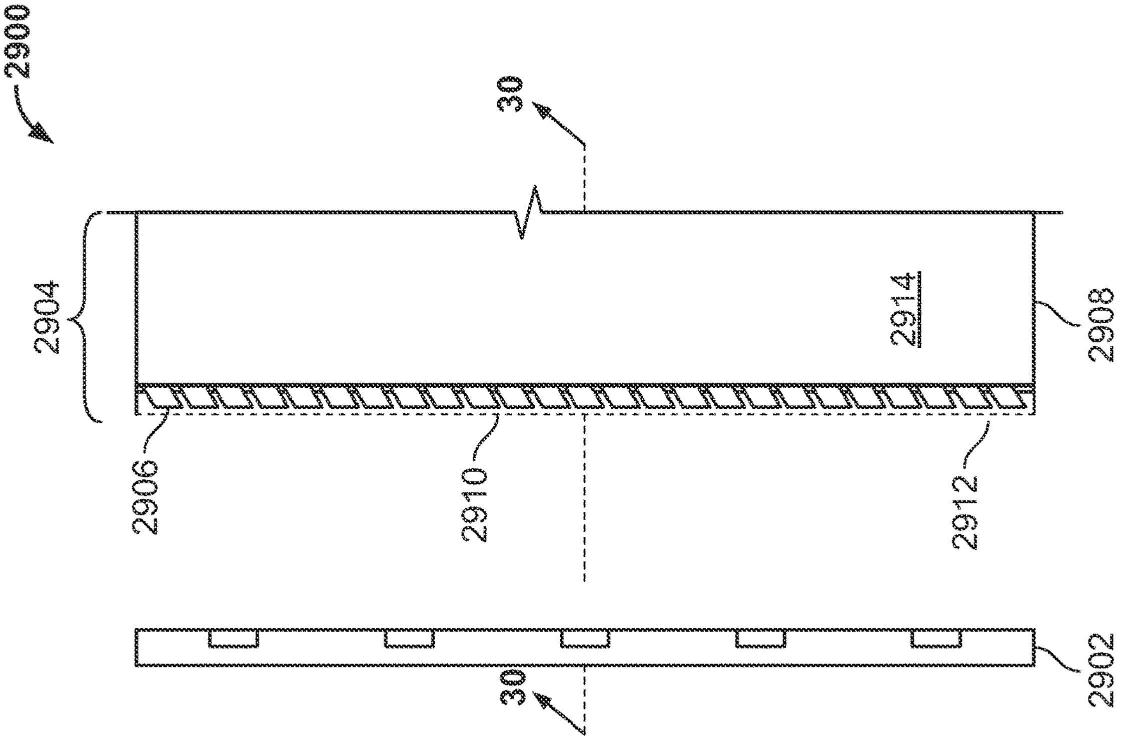

FIG. 29 shows schematically illustrative apparatus in accordance with principles of the invention.

Figure 30:
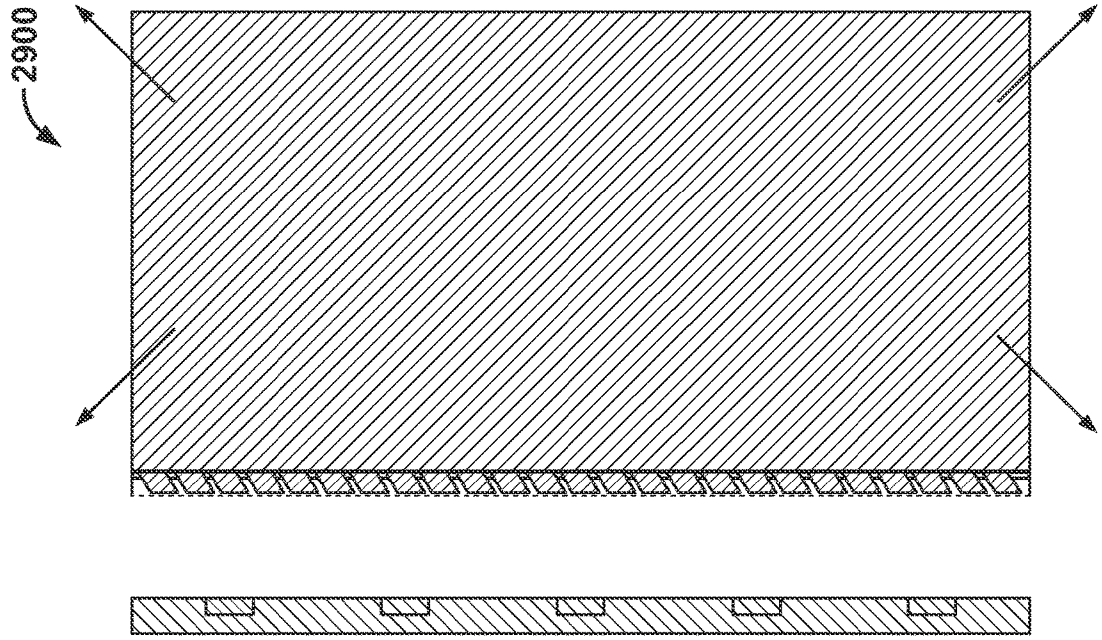

FIG. 30 shows schematically illustrative apparatus in accordance with principles of the invention.

Figure 31:
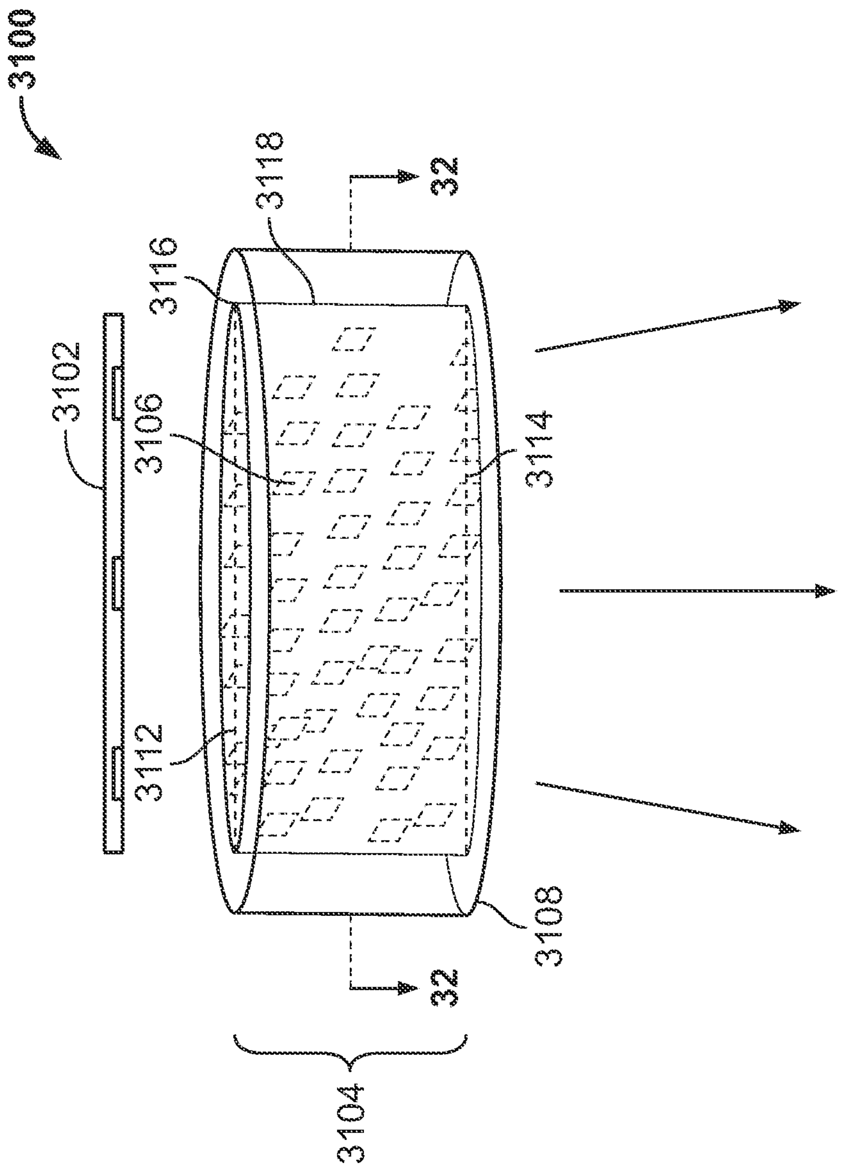

FIG. 31 shows schematically illustrative apparatus in accordance with principles of the invention.

Figure 33:
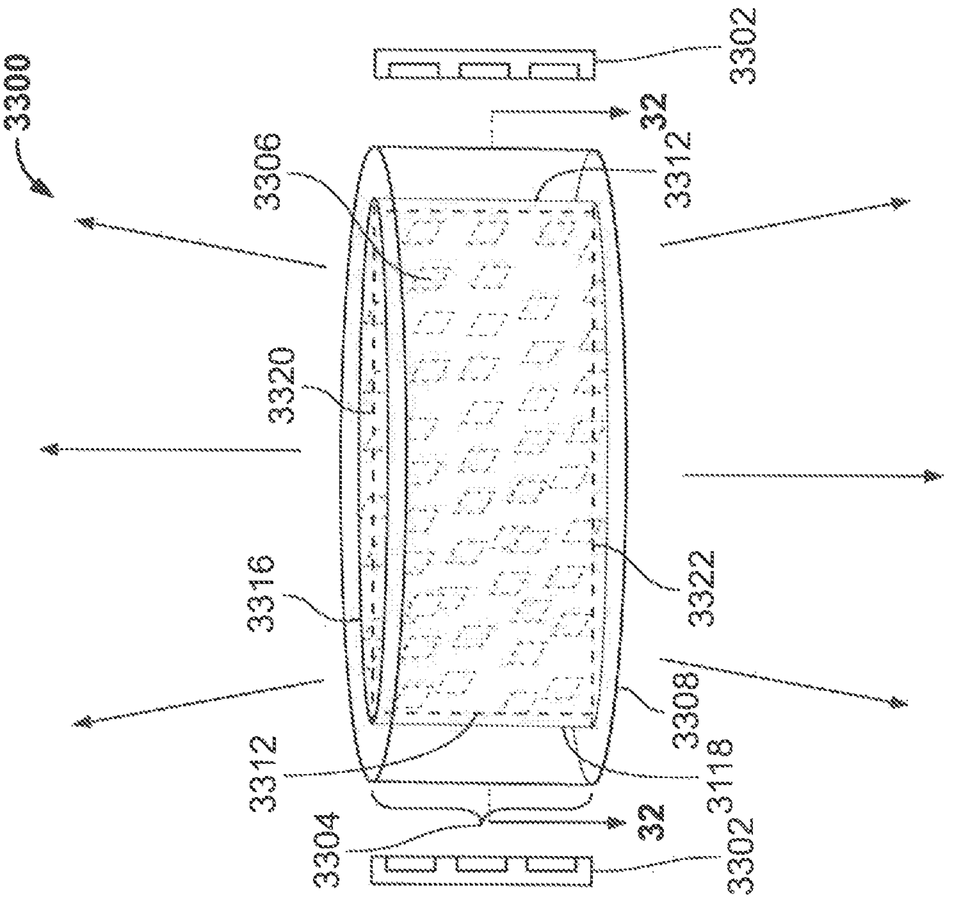
Figure 32:
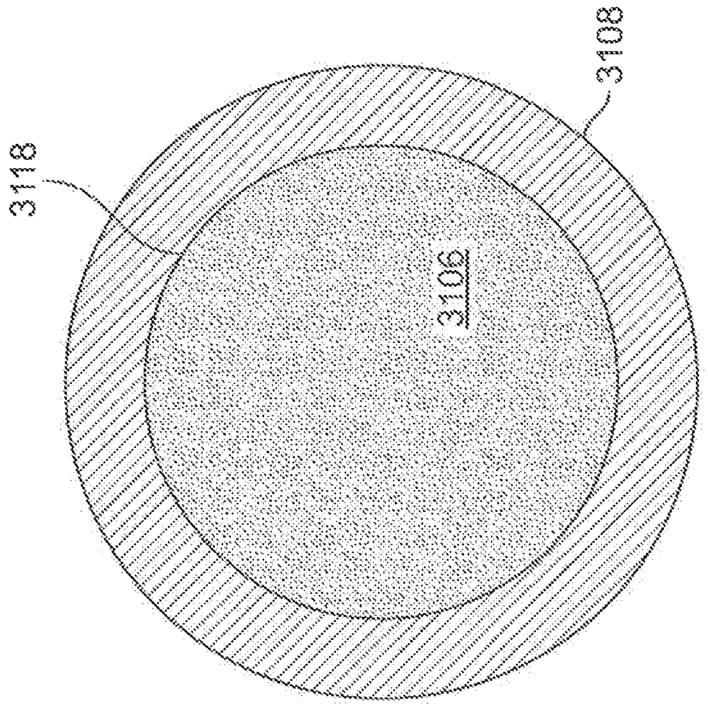

FIG. 32 shows schematically a partial cross-section of apparatus shown in FIGS. 31 and 33 taken along view lines 32-32 (shown in FIGS. 31 and 33, respectively).

FIG. 33 shows schematically illustrative apparatus in accordance with principles of the invention.

Figure 34:
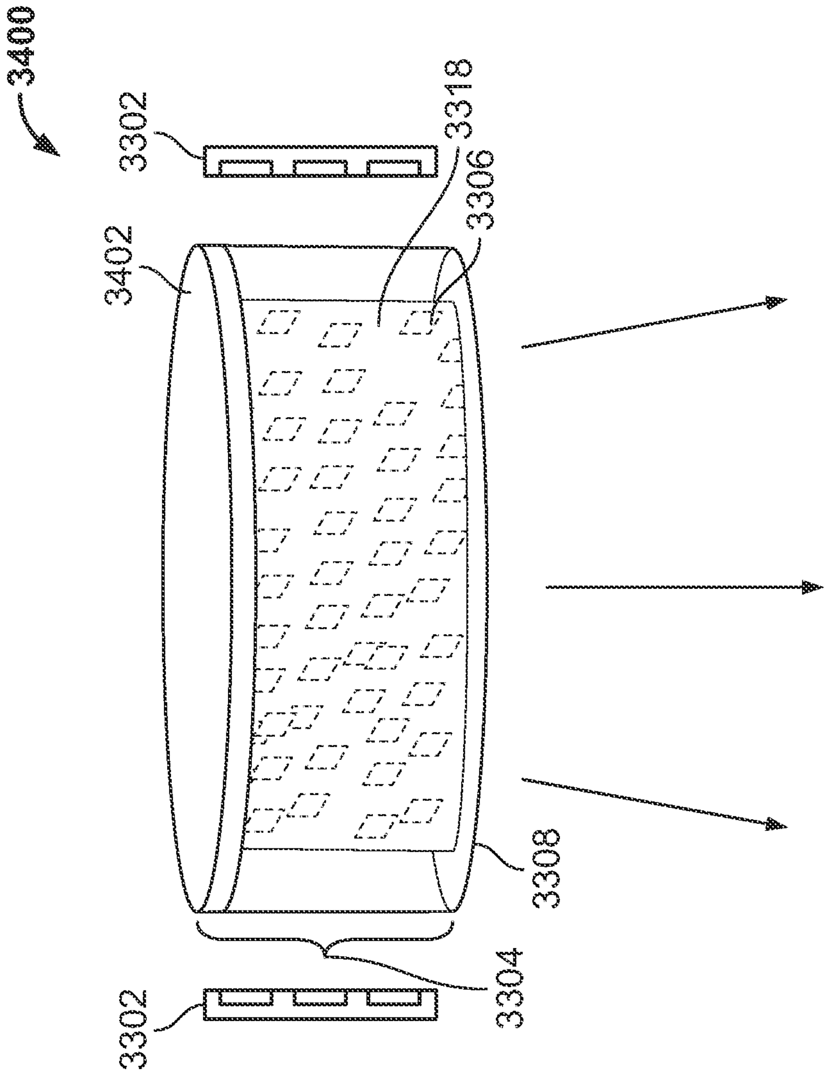

FIG. 34 shows schematically illustrative apparatus in accordance with principles of the invention.

Figure 35:
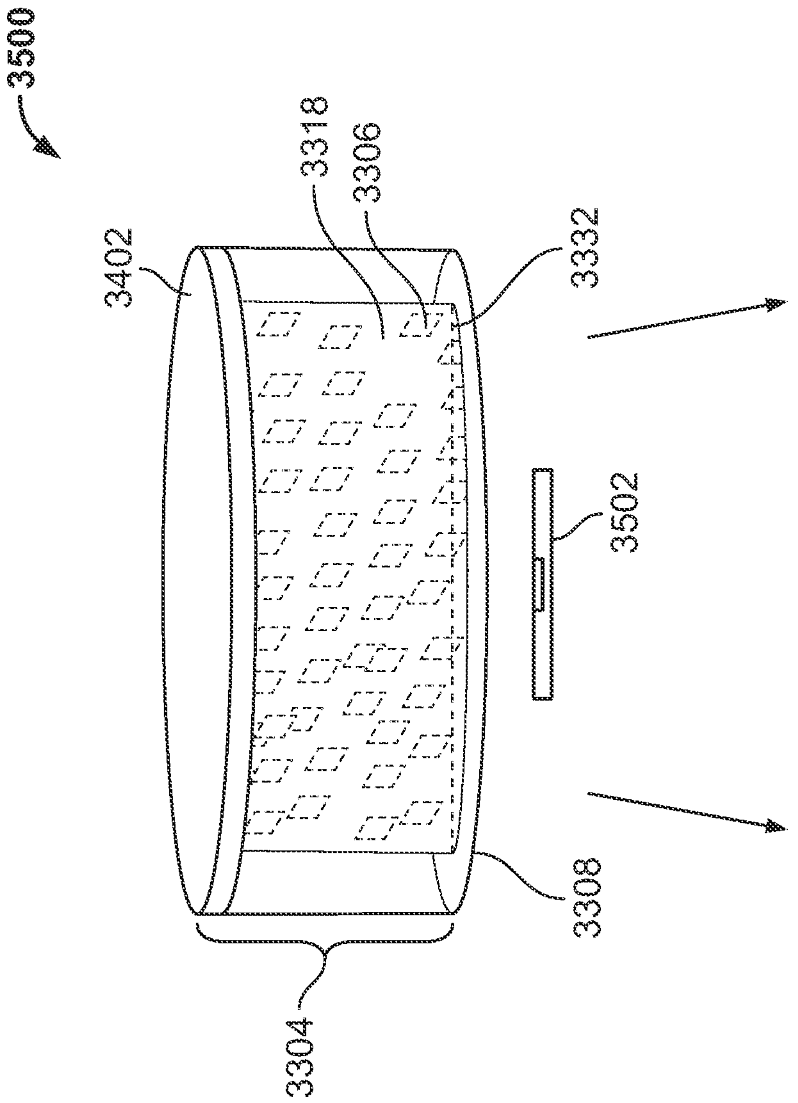

FIG. 35 shows schematically illustrative apparatus in accordance with principles of the invention.

Figure 36:
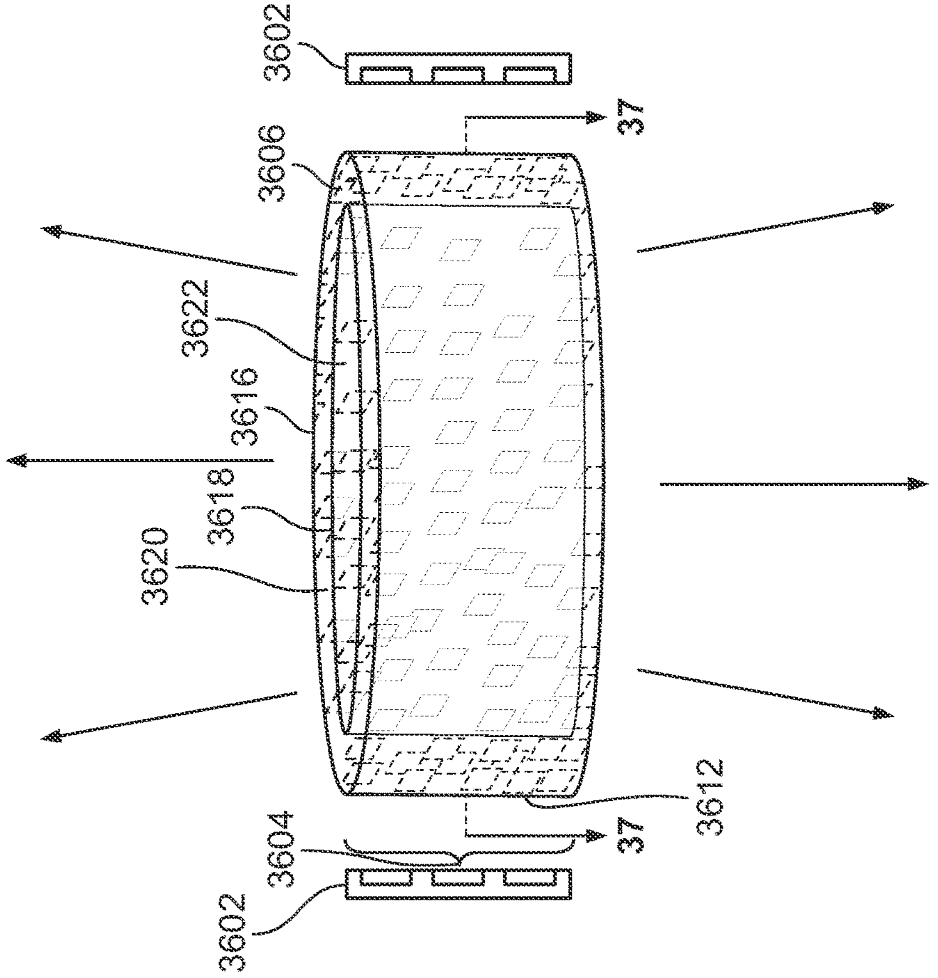

FIG. 36 shows schematically illustrative apparatus in accordance with principles of the invention.

Figure 37:
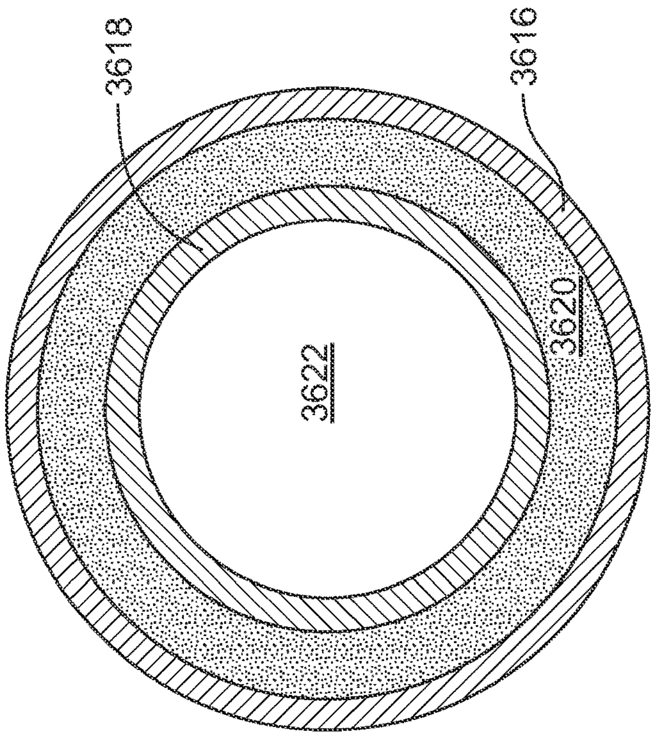
Figure 38:
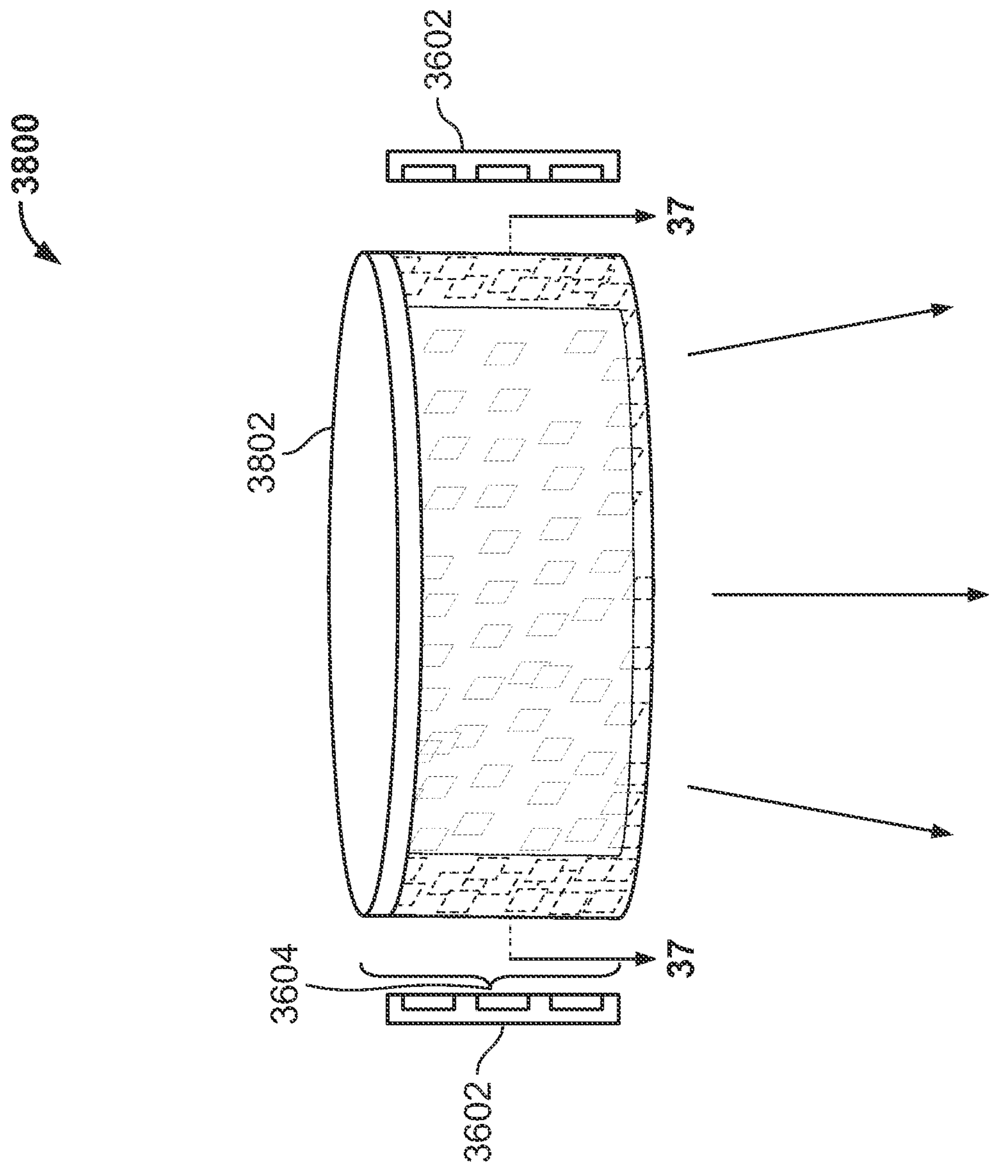

FIG. 37 shows schematically a partial cross-section of apparatus shown in FIGS. 36 and 38 taken along view lines 37-37 (shown in FIGS. 36 and 38, respectively).

FIG. 38 shows schematically illustrative apparatus in accordance with principles of the invention.

Figure 39:
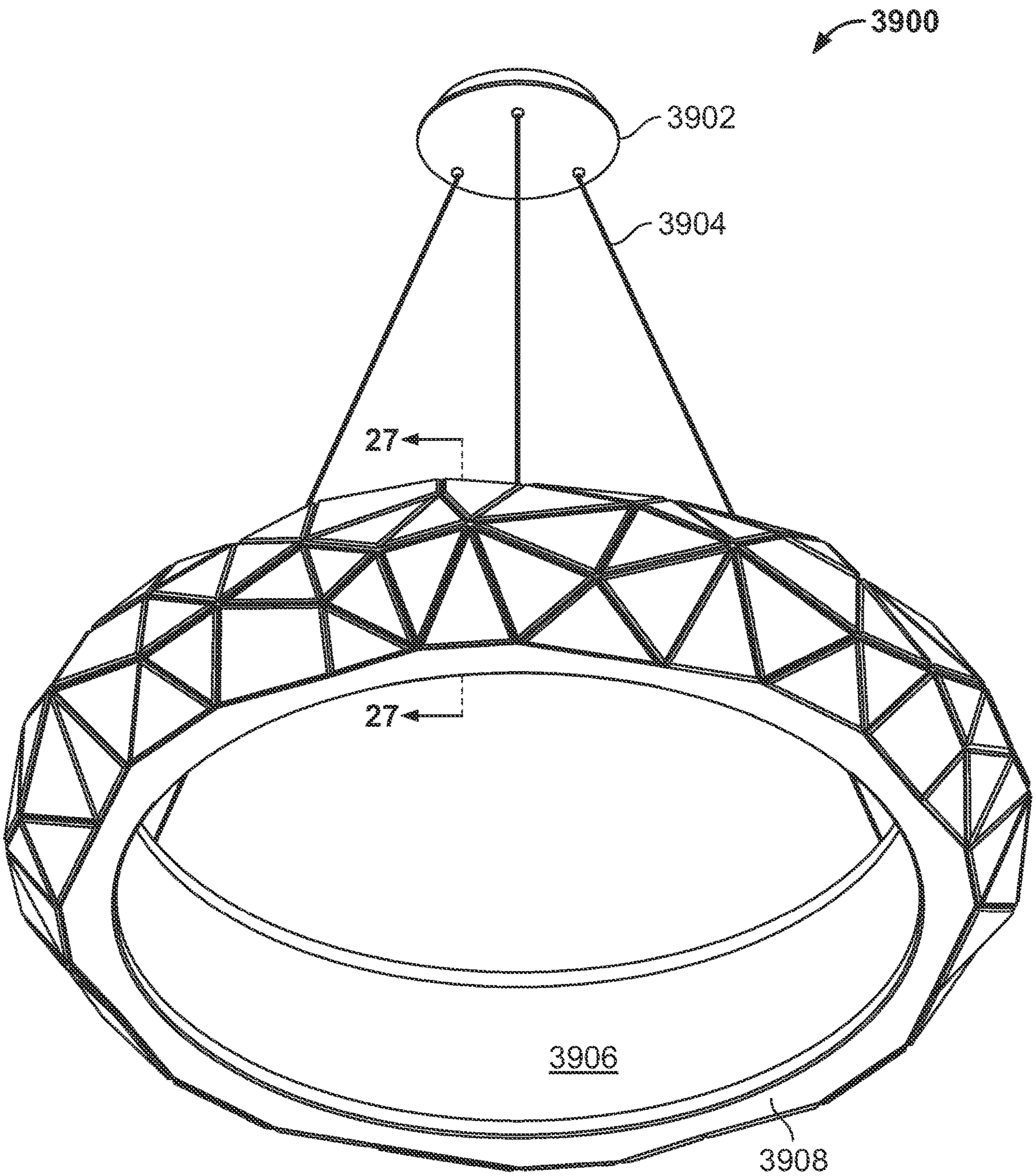

FIG. 39 shows schematically illustrative apparatus in accordance with principles of the invention.

Figure 40:
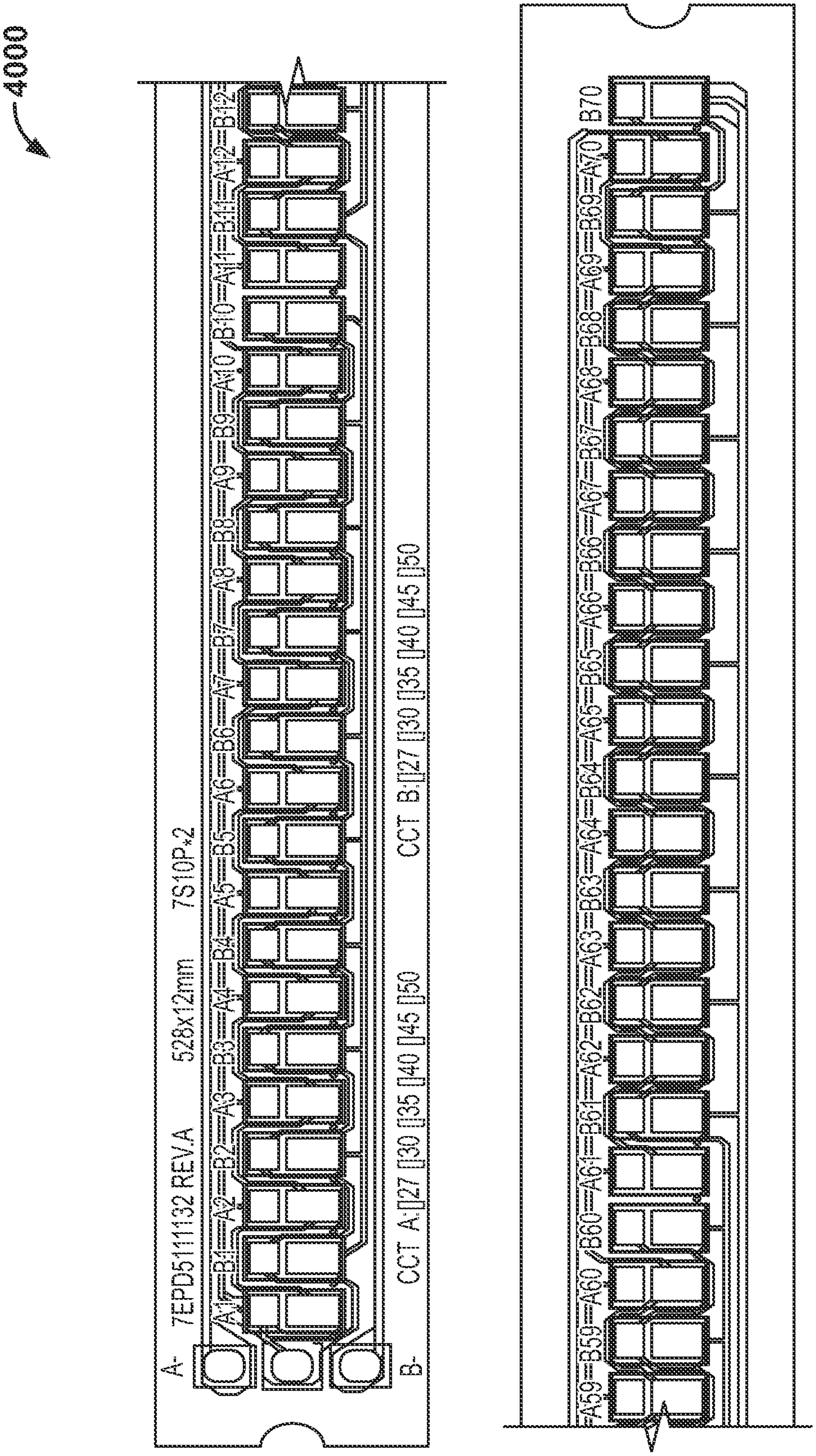

FIG. 40 shows schematically illustrative apparatus in accordance with principles of the invention.

The leftmost digit (e.g., "L") of a three-digit reference numeral (e.g., "LRR"), and the two leftmost digits (e.g., "LL") of a four-digit reference numeral (e.g., "LLRR"), generally identify the first figure in which a part is called-out.

DETAILED DESCRIPTION

Apparatus and methods for enhanced lighting are provided. The apparatus may include a light-transmitting body. The apparatus may include a light projector. The projector may be configured to propagate into the light-transmitting body an incoming incoherent light. The projector may be configured to propagate into the light-transmitting body an incoming visible coherent light. Emerging coherent light within a visible wavelength rage attributable to the incoming visible coherent light may have a first intensity. The first intensity may be greater than a second intensity. The second intensity may be an intensity of any emerging coherent light that is within the wavelength range and is attributable to the incoming incoherent light. Emerging light may be light that emerges from the light-transmitting body.

The apparatus may include a diffusing element. The diffusing element may include a diffuser. The diffusing element may include grains. The grains may include facets. The grains may be spherical. The grains may be spheroidal. The grains may include refractive material. The refractive material may cause light from the LED light source to disperse into different colors of the spectrum. The refractive material may include crystal. The refractive material may include non-crystal material. The non-crystal material may include glass. The facets may be cut. the facets may be machine-cut. The facets may be cut. the facets may be molded.

The diffusing element may scatter light. The scattering may include reflection. The scattering may include diffraction. The scattering may be in the forward direction (going through the matter on which the light is incident). The scattering may be in the backward direction. The scattering may be in in a direction perpendicular to or oblique to the direction of light incident on the diffuser, or in any direction between the forward direction and the backward direction. The diffusing element may have dichroic properties.

The second intensity may be zero. The first intensity may be a multiple of the second intensity. The multiple may be expressed as a ratio of the first intensity to the second intensity.

Each of the first and second intensities may be defined as a sum of intensities of wavelengths in the range. Each of the first and second intensities may be defined as an average of intensities of wavelengths in the range. Each of the first and second intensities may be defined as a peak intensity of wavelengths in the range.

The light-transmitting body may have a refractive index that is not less than 1.52. The light-transmitting body may have a refractive index that is not greater than 1.69.

The light-transmitting body may have a refractive index that is no greater than 1.6. The light-transmitting body may have a refractive index that is no greater than 1.5.

The apparatus may include a fixture. The fixture may include the light-transmitting body. The fixture may include the light projector.

The projector may include a phosphor-converted light-emitting diode ("LED"). The phosphor-converted LED may produce the incoming incoherent light.

The projector may include LEDs that are configured to emit different colors to produce the incoming incoherent light.

The LEDs may include a red-green-blue ("RGB") LED group.

The LEDs may include LEDs configured to emit violet light. The LEDs may include LEDs configured to emit indigo light. The LEDs may include LEDs configured to emit blue light. The LEDs may include LEDs configured to emit green light. The LEDs may include LEDs configured to emit yellow light. The LEDs may include LEDs configured to emit orange light. The LEDs may include LEDs configured to emit red light. The LEDs may include LEDs of different correlated color temperatures ("CCT"). The different CCTs may include any CCTs in the range of 1800° K to 5000° K.

The apparatus may include a diffuser. The diffuser may be disposed between the projector and the light-transmitting body.

The apparatus may include a dichroic layer. The dichroic layer may be disposed between the projector and the light-transmitting body. The dichroic layer may be spaced apart from the light-transmitting body. The dichroic layer may be a coating. The coating may be on the grains.

The apparatus may include a translucent sheet. The translucent sheet may be disposed between the projector and the light-transmitting body. The translucent sheet may include one or more facets. The facets may be configured to direct the incoming incoherent light and the incoming visible coherent light to the light-transmitting body in more than one direction. The facets may be configured to reflect the incoming incoherent light and the incoming visible coherent light to the light-transmitting body in more than one direction. The facets may be configured to specularly reflect the incoming incoherent light and the incoming visible coherent light to the light-transmitting body in more than one direction. The translucent sheet may be configured to refract the incoming incoherent light and the incoming visible coherent light to the light-transmitting body in more than one direction.

The apparatus may include a reflector. The reflector may be configured to reflect the incoming incoherent light and the incoming visible coherent light from the projector to the light-transmitting body.

The reflector may be opaque. The reflector may be semi-opaque.

The projector may have a front. The projector may have a back. The projector may project frontally toward the reflector. The light-transmitting body may be disposed in back of the projector.

The dichroic filter may be disposed between the projector and the reflector.

The diffuser may include one or more perforations.

The apparatus may include an LED light source. The LED light source may be configured to emit a beam of light. The apparatus may include a diffusive element. The diffusive element may include includes grains. A grain may have a diameter. The diameter may be defined as a greatest linear dimension between two points of the grain.

The grains may be formed by chemical vapor deposition ("CVD").

Each grain may have a diameter D that is in a range from 2.0-3.1 mm. The diffusive element may be fixed at a position relative to the LED light source such that in operation the beam is incident on the diffusive element.

The grains may be grains that are not connected to each other by grain boundaries of a polycrystalline material. The grains may be grains that are not connected to each other by grain boundaries of a monolithic polycrystalline material.

Grain-to-grain bonds between the grains may be bonds that do not include material excluded from the grains during growth of the grains.

The apparatus may include space between the grains. The space may be occupied only by a fluid. The fluid may include air. The space may include a bonding material.

The grains may be spaced apart from each other at a distance from each other. The distance d between neighboring grains may be in the range 2.7-3.3 mm. d may be defined as the distance between the closest points of two grains. Table 1 lists illustrative distances between neighboring grains.

TABLE 1

| Illustrative distances between neighboring grains. Illustrative distances between neighboring grains (mm) Range | |
|---|---|
| Lower | Upper |
| <1.7 | 1.7 |
| 1.7 | 2.3 |
| 1.8 | 2.4 |
| 1.9 | 2.5 |
| 2 | 2.6 |
| 2.1 | 2.7 |
| 2.2 | 2.8 |
| 2.3 | 2.9 |
| 2.4 | 3 |
| 2.5 | 3.1 |
| 2.6 | 3.2 |
| 2.7 | 3.3 |
| 2.8 | 3.4 |
| 2.9 | 3.5 |
| 3 | 3.6 |
| 3.1 | 3.7 |
| 3.2 | 3.8 |
| 3.3 | 3.9 |
| 3.4 | 4 |
| 3.5 | 4.1 |
| 3.6 | 4.2 |
| 3.7 | 4.3 |
| 4.3 | >4.3 |
| Other suitable lower limits | Other suitable upper limits |

The diffusive element may include a substrate that is configured to retain the grains. The apparatus may include a bonding material that fixes the grains to the substrate. The grains may be affixed to each other by a bonding material. The bonding material may include glue. The glue may be that glue available under the trade name LOCTITE from Henkel AG & Co. KGaA, Dusseldorf, Germany, for example, as model number 3926, or any other suitable glue.

The grains may be translucent. The substrate may include glass. The substrate may include crystal. The substrate may include polymer. The substrate may be translucent. The substrate may be opaque. The substrate may be partially optically transmissive. The apparatus may include a light blocking layer. The light blocking layer may be reflective. The light blocking layer may be non-reflective. The light blocking layer may be disposed on a surface of the substrate. The dichroic layer may be on the substrate. The dichroic layer may be on the substrate and not on the grains.

The substrate may have a thickness. Table 2 lists illustrative ranges that may include the thickness.

TABLE 2

| Illustrative ranges that may include the substrate thickness. Illustrative ranges that may include the substrate thickness (mm) | |
|---|---|
| Range Lower | Upper |
| 1 | 1.5 |
| 1.5 | 2 |
| 2 | 2.5 |
| 2.5 | 3 |
| 3 | 3.5 |
| 3.5 | 4 |
| 4 | 4.5 |

TABLE 2-continued

| Illustrative ranges that may include the substrate thickness. Illustrative ranges that may include the substrate thickness (mm) | |
|---|---|
| Range Lower | Upper |
| 4.5 | 5 |
| 5 | 10 |
| 10 | 50 |
| 50 | 100 |
| 100 | >100 |
| Other suitable lower limits | Other suitable upper limits |

The grains may be grains that are not bonded to the substrate.

The grains define a layer that has an average thickness. The bonding material, in a liquid phase, may whet the grains, on average, to height that is no less than 0.1 of the thickness; and no more than 0.3 of the thickness. The bonding material, in a bonded phase, may contact the grains up to a height that is: no less than 0.1 of the thickness and no more than 0.3 of the thickness.

Table 3 lists illustrative bonding material-grain contact heights.

TABLE 3

| Illustrative bonding material-grain contact heights. Illustrative bonding material-grain contact heights (relative to grain layer thickness) | |
|---|---|
| Range Lower | Upper |
| <0.05 | 0.05 |
| 0.05 | 0.1 |
| 0.1 | 0.15 |
| 0.15 | 0.2 |
| 0.2 | 0.25 |
| 0.25 | 0.3 |
| 0.3 | 0.35 |
| 0.35 | 0.4 |
| 0.4 | 0.45 |
| 0.45 | 0.5 |
| 0.5 | >0.5 |
| Other suitable lower limits | Other suitable upper limits |

The diffusive element includes a bed of grains. The bed may be disposed in the substrate. The grains may be grains that are not bonded to each other. The grains may be sintered to each other. The bed may include grains of different sizes. The bed may have a thickness, in grains, o any suitable number of grains. Table 4 lists illustrative ranges that may include the thickness, in number of grains, in the bed.

TABLE 4

| Illustrative ranges that may include the thickness, in number of grains, in the bed. Illustrative ranges that may include the thickness, in number of grains, in the bed | |
|---|---|
| Range Lower | Upper |
| 1 | 1.5 |
| 1.5 | 2 |

TABLE 4-continued

| Illustrative ranges that may include the thickness, in number of grains, in the bed. Illustrative ranges that may include the thickness, in number of grains, in the bed | |
|---|---|
| Range Lower | Upper |
| 2 | 2.5 |
| 2.5 | 3 |
| 3 | 3.5 |
| 3.5 | 4 |
| 4 | 4.5 |
| 4.5 | 5 |
| 5 | >5 |
| Other suitable lower limits | Other suitable upper limits |

The diffusive element may have an LED-facing side. The diffusive element may have an illuminating side. In operation, an intensity of a light exiting the illuminating side, as measured across the area of the illuminating side, may have an amplitude that does not exceed 5% of an average intensity of a light entering the LED-facing side, as measured across the area of the LED-facing side.

The substrate may be translucent. Each of the grains may be translucent. The grains may have facets. The facets may be arranged to diffuse light. The diffusive element may be a first diffusive element. The apparatus may include no second diffusive element.

The first diffusive element may have a first side. The first diffusive element may have a second side. The LED light source in operation may emit light that is incident on the first side and is transmitted through the second side.

The second side may be parallel to the first side. The second side may be oblique to the first side. The second side may be perpendicular to the first side.

The substrate may define the first side and the second side.

A surface of the substrate may define the first side. The grains may define the second side.

The grains may define the first side. A surface of the substrate may define the second side.

An arrangement of the grains may face the LED light source. The arrangement may intervene between the LED light source and the substrate.

The grains may define the first side and the second side.

The substrate may be disposed between the LED light source and the grains.

The grains may be disposed between the LED light source and the substrate.

The substrate may define a face. The substrate may define, perpendicular to the face, an edge. The LED light source may be configured to emit light that is incident on the face. The grains may be disposed on the edge. The substrate may be configured to guide light from the LED light source through the grains.

The substrate may define a face. The substrate may define, perpendicular to the face, an edge. The grains may be disposed on the face. The LED light source may be configured to emit light that is incident on the grains. The grains may be configured to diffuse light from the light source. The substrate may be configured to receive diffused light from the grains and guide the diffused light through the edge.

The substrate may define a face. The substrate may define, perpendicular to the face, an edge. The grains may be disposed on the edge. The LED light source may be configured to emit light that is incident on the grains. The grains may be configured to diffuse light from the light source. The substrate may be configured to receive diffused light from the grains and guide the diffused light through the face.

The substrate may define a face. The substrate may define, perpendicular to the face, an edge. The LED light source may be configured to emit light that is incident on the edge. The grains may be disposed on the face. The substrate may be configured to guide light from the LED light source through the grains.

The substrate may define a recess. The grains may be disposed in the recess. The recess may be annular. The recess may be angular. The recess may be rectangular. The recess may have any suitable shape.

The substrate may define a region that is separated from the recess by a partition. The region may be bound by a surface having a cylindrical shape. The region may be bound by a surface having a rectilinear shape. The region may be bound by a surface having a concave shape. The region may be bound by a surface having a convex shape. The recess may circumscribe the region.

Each of the grains may be translucent. The grains may be arranged to diffuse light. The diffusive element may be a first diffusive element. The apparatus may be an apparatus that includes no second diffusive element.

The substrate may define a region. The grains may be disposed in the region. The LED light source may be configured to propagate light into the grains. The grains may be configured to diffuse the light.

The LED light source may be configured to propagate light through the substrate into the grains. The LED light source may be configured to propagate light into an interior of the region without propagating light into the region through the substrate.

The apparatus may include a reflector. The reflector may be configured to reflect light into an interior of the region. The reflector may be positioned at an end of the conduit. The LED light source may be positioned at the end of the conduit.

The region may have a first end. The region may have a second end opposite the first end. The reflector may be positioned at the first end. The LED light source may be positioned at the second end. The LED light source may face the reflector.

The reflector may be disposed on an interior surface of the region.

Figure 1:
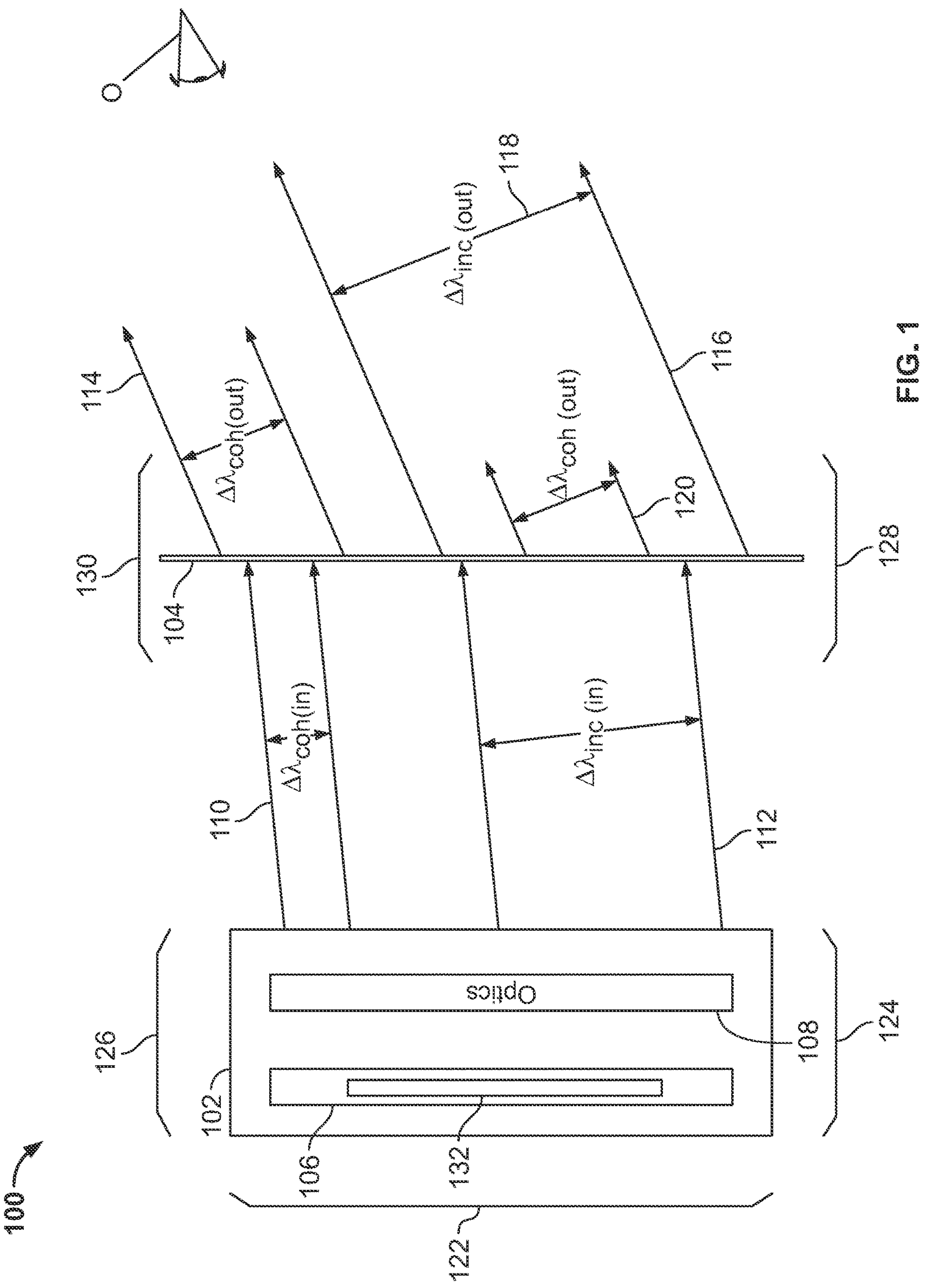
FIG. 1 shows schematically illustrative apparatus in accordance with principles of the invention.

FIG. 1 shows schematically illustrative arrangement 100 for enhanced diffusion. Illustrative arrangement 100 may include projector 102. Illustrative arrangement 100 may include light transmitting body 104. Light-transmitting body 104 may be a decorative element of a light fixture. Light-transmitting body 104 may have diffusive properties.

Projector 102 may include light source 106. Projector 102 may include light optics 108. Projector 102 may include a structure for supporting light source 106. Projector 102 may include a structure for supporting light optics 108. Light source 106 may function as a projector. Light optics 108 may function as a projector. Light source 106 and light optics 108 may function together as a projector. One or more of light source 106, light optics 108 and any other suitable item may function together as a projector.

Projector 102 may project toward light-transmitting body 104 colored light 110. Colored light 110 may be coherent light. Colored light 110 may be in the visible spectrum. Colored light 110 may include light in wavelength range $\Delta\lambda_{coh}$(in). $\Delta\lambda_{coh}$(in) may be light that is input ("in") to light-transmitting body 104.

Projector 102 may project toward light-transmitting body 104 white light 112. White light 112 may be incoherent light.

White light 112 may include wavelengths in the visible spectrum. White light 112 may include light in wavelength range $\Delta\lambda_{inc}$ (in). $\Delta\lambda_{inc}$(in) may be light that is input ("in") to light-transmitting body 104.

$\Delta\lambda_{inc}$(in) may be a broader wavelength range than $\Delta\lambda_{coh}$ (in). The intensity of white light 112 may be greater than the intensity of colored light 110.

Colored light 110 and white light 112 may by scattered by light-transmitting body 104. The scattering may include reflection. The scattering may include refraction. The scattering may be in the forward direction (the direction of propagation from projector 102). The scattering may be in the backward direction (opposite the direction of propagation from projector 102). The scattering may be in in a direction perpendicular to or oblique to the direction of propagation from projector 102.

Colored light 114 may emerge from light-transmitting body 104. Colored light 114 may be sourced from colored light 110. Colored light 114 may be coherent light. Colored light 114 may be in the visible spectrum. Colored light 114 may include light in wavelength range $\Delta\lambda_{coh}$(out). $\Delta\lambda_{coh}$ (out) may partially or completely overlap $\Delta\lambda_{coh}$(in).

Light 116 may emerge from light-transmitting body 104.

Light 116 may be sourced from white light 112. Light 116 may include white light 118. White light 118 may be incoherent. White light 118 may include light in wavelength range $\Delta\lambda_{inc}$ (out).

Light 116 may include colored light 120. Colored light 120 may be coherent. Colored light 120 may include light in wavelength range $\Delta\lambda_{coh}$ (out). Colored light 120 may be sourced from white light 112. Colored light 120 may result from separation of white light 112 by light-transmitting body 104. The separation may be from refraction.

The intensity of colored light 114 may be greater than the intensity of colored light 120. The intensity of colored light 120 may be below perception of a human observer such as observer O. Observer O may perceive a juxtaposition of colored light 114 and white light 118. White light 118 may illuminate a space. Colored light 114 may appear as a colored region of light-transmitting body 104.

Light source 106 may include one or more LEDs. The LEDs may emit different light of different colors. The LEDs may emit white light.

Optics 108 may diffuse light emitted from light source 106. Optics 108 may permit the propagation of colored light 110 from projector 102. Optics 108 may permit the propagation of white light 110 from light source 106. Optics 108 may mix colored light emitted from light source 106 to produce white light 112. Table 5 lists illustrative optics 108 elements.

TABLE 5

| Illustrative optics 108 elements |
|---|
| Diffuser |
| Lens |
| Optical mixer |
| Dichroic element |
| Optical filter |
| Polarizer |
| Mirror |
| Reflector |
| Other suitable elements |

Arrangement 100 may include one or more reflectors such as reflectors 122, 124, 126, 128 and 130. One or more of the reflectors may have dichroic properties. One or more of the reflectors may have a mirror finish. One or more of the reflectors may be translucent.

Light source 106 may include LED board 132. LED board 132 may support one or more LEDs. One or more of the LEDs may emit white light. The LEDs may include LEDs that emit white light of different coordinated color temperatures. One or more of the LEDs may emit colored light. All of the LEDs may emit white light. All of the LEDs may emit colored light. The colored light of the LEDs may be of the same color. The colored light of the LEDs may be of different colors.

Figure 2:
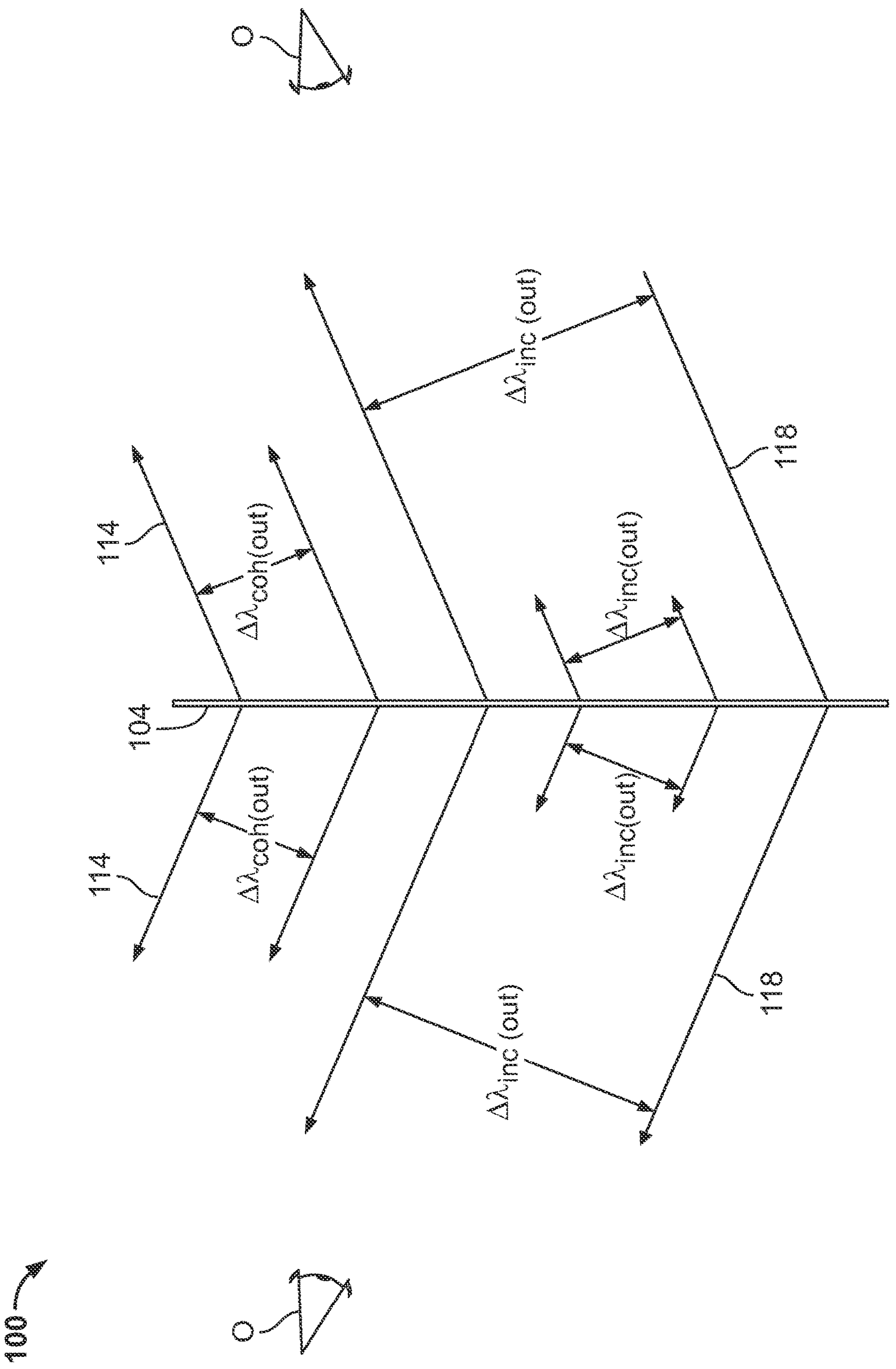
FIG. 2 shows schematically illustrative apparatus in accordance with principles of the invention.

FIG. 2 shows schematically colored light 114 and white light 118 emerging from light-transmitting body 104 in different directions. Projector 102 is not shown. Projector 106 may be located behind the plane of FIG. 2, in front of the plate of FIG. 2, to the left of light-transmitting body 104, to the right of light-transmitting body 104 or in any other suitable position. Observer O may observe colored light 114 and white light 118 from different positions, such as the two different positions shown.

Figure 3:
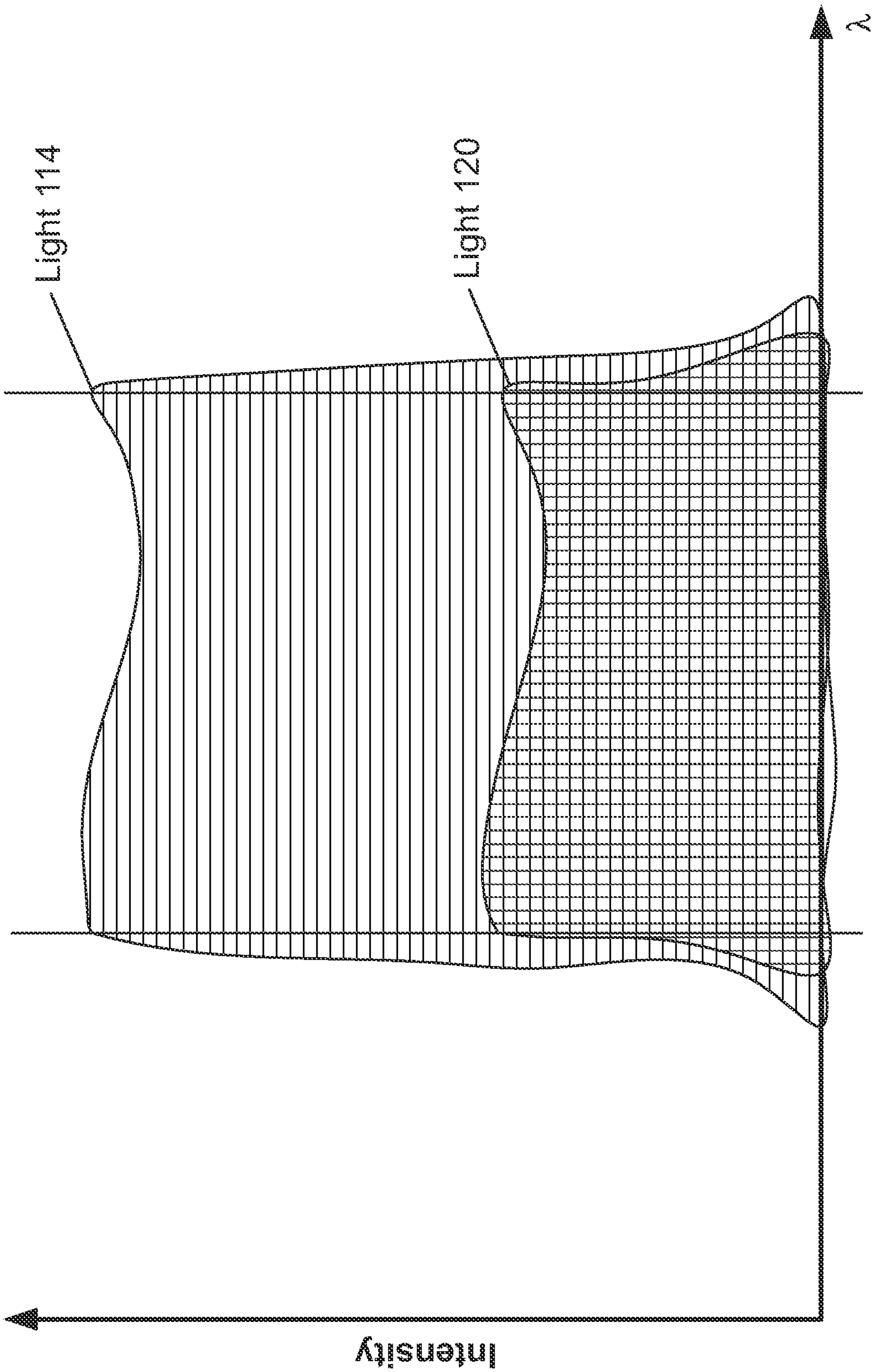
FIG. 3 shows illustrative information in accordance with principles of the invention.

FIG. 3 shows schematically the intensities of colored light 114 and colored light 120. Wavelength bands of light 114 and 120 may be defined as being identical.

Figure 4:
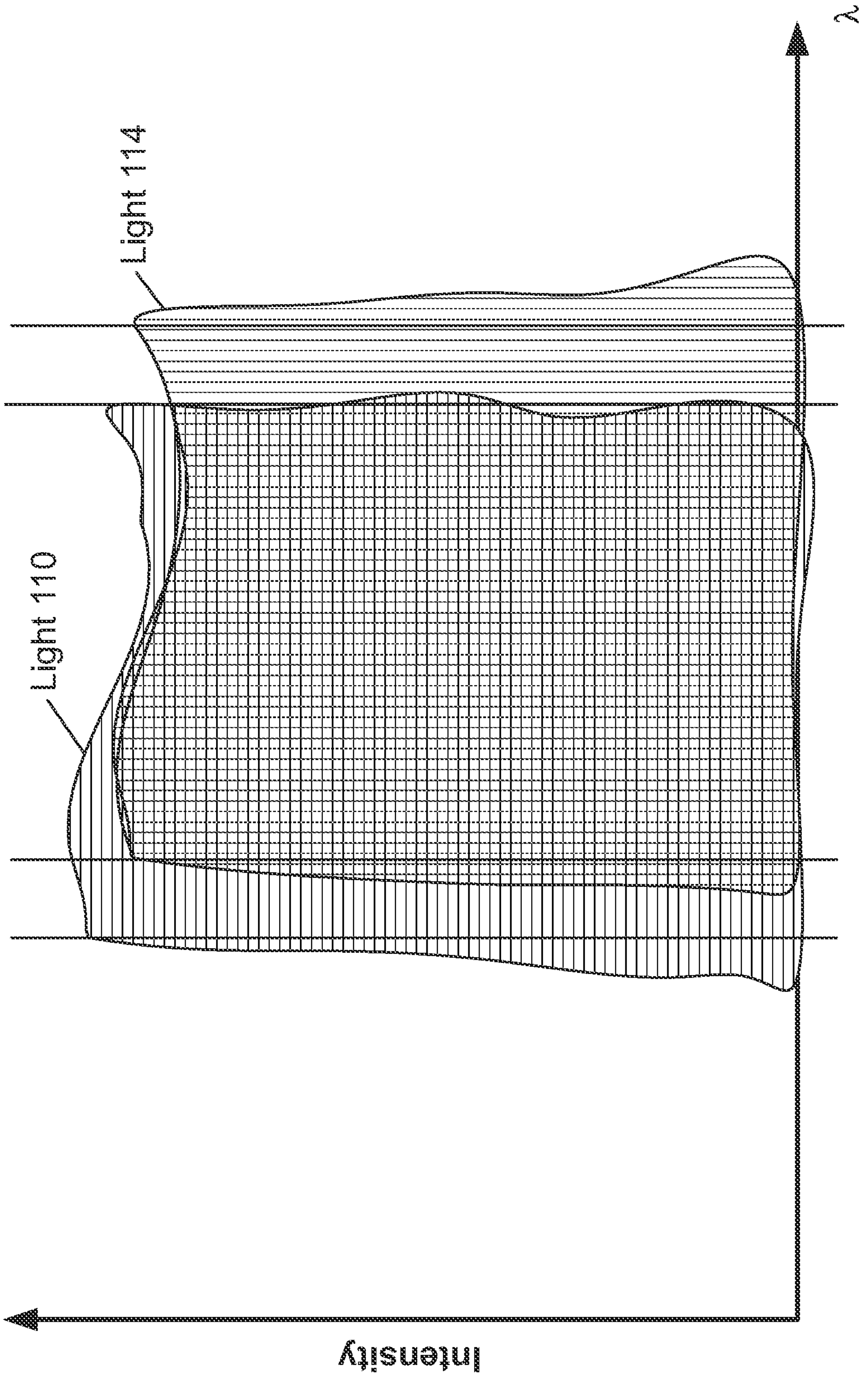
FIG. 4 shows illustrative information in accordance with principles of the invention.

FIG. 4 shows schematically the intensities of colored light 114 and colored light 110. The intensity of colored light 110 may be greater than the intensity of colored light 114. The diminished intensity of colored light 114 may be the result of scattering in light-transmitting body 104. The wavelength range of colored light 114 may be shifted relative to the wavelength range of colored light 110. The shift may be the result of refraction in light-transmitting body 104.

Figure 5:
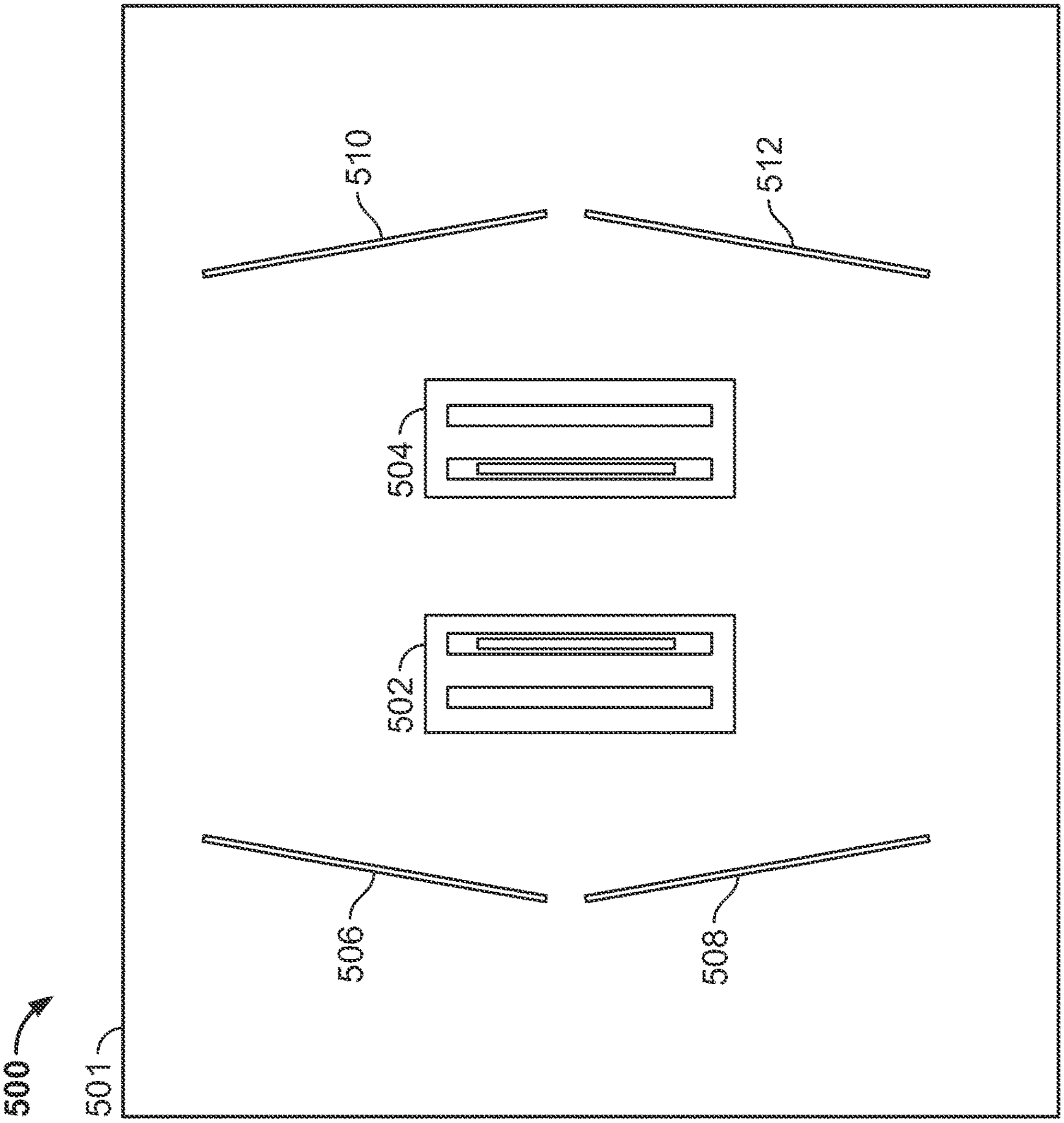
FIG. 5 shows schematically illustrative apparatus in accordance with principles of the invention.

FIG. 5 shows illustrative fixture 500. Illustrative fixture 500 may include frame 501. Illustrative fixture 500 may include projectors 502 and 504. Illustrative fixture 500 may include light-transmitting bodies 506, 508, 510 and 512. Projectors 502 and 504 may have one or more features in common with projector 102. Light-transmitting bodies 506, 508, 510 and 512 may have one or more features in common with light-transmitting body 104.

Figure 6:
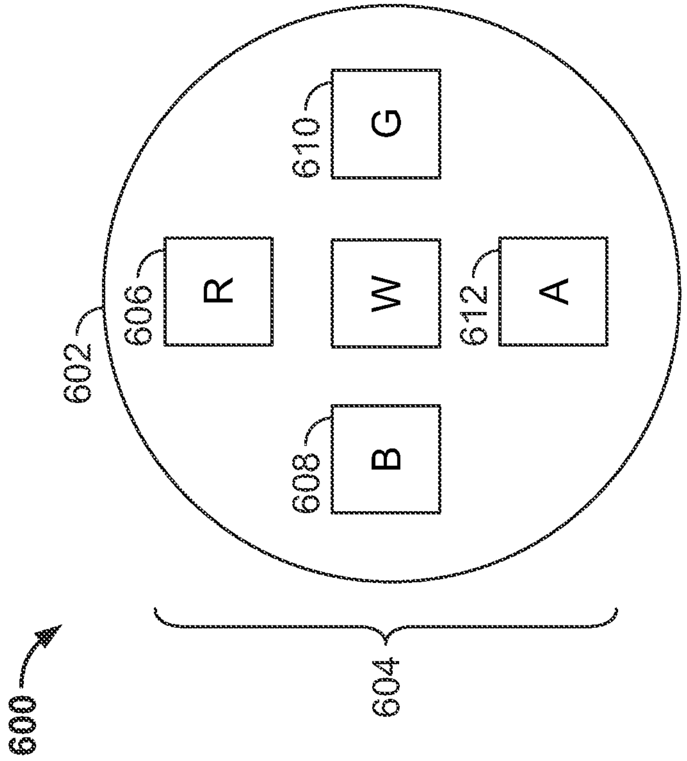
FIG. 6 shows schematically illustrative apparatus in accordance with principles of the invention.

FIG. 6 shows schematically illustrative LED board 600. Board 600 may be disposed in a light source such as 106. Board 600 may have one or more features in common with LED board 132. Board 600 may include LED holder 602. Board 600 may include one or more LEDs 604. LEDs 604 may include red LED 606 ("R"). LEDs 604 may include blue LED 608 ("B"). LEDs 604 may include green LED 610 ("G"). LEDs 604 may include amber LED 612 ("A"). LEDs 604 may include white LED 614 ("W"). LEDs 604 may define a pattern. Board 600 may include other LEDs arranged in the pattern. Board 600 may include other LEDS arranged in a different pattern.

Figure 7:
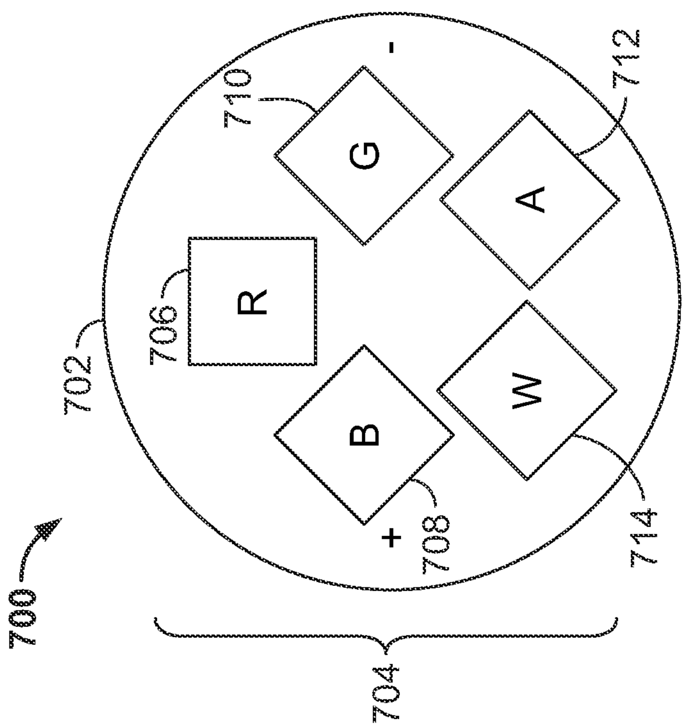
FIG. 7 shows schematically illustrative apparatus in accordance with principles of the invention.

FIG. 7 shows schematically illustrative LED board 700. Board 700 may be disposed in a light source such as 106. Board 700 may have one or more features in common with LED board 132. Board 700 may include LED holder 702. Board 700 may include one or more LEDs 704. LEDs 704 may be arranged in a pattern that is different from the pattern in which LEDs 604 are arranged. LEDs 704 may include red LED 706 ("R"). LEDs 704 may include blue LED 708 ("B"). LEDs 704 may include green LED 710 ("G"). LEDs 704 may include amber LED 712 ("A"). LEDs 704 may include white LED 714 ("W"). LEDs 704 may define a pattern. Board 700 may include other LEDs arranged in the pattern. Board 700 may include other LEDs arranged in a different pattern.

Figure 8:
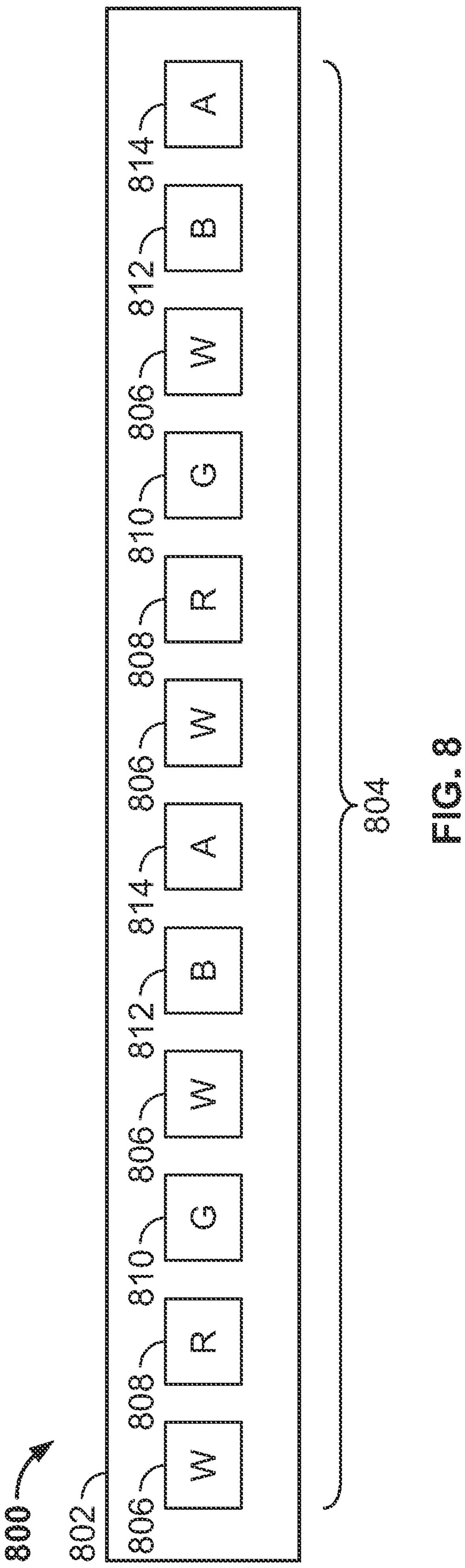
FIG. 8 shows schematically illustrative apparatus in accordance with principles of the invention.

FIG. 8 shows schematically illustrative LED board 800. Board 800 may be disposed in a light source such as 106.

Board 800 may have one or more features in common with LED board 132. Board 800 may include LED holder 802. Board 800 may include one or more LEDs 804.

LEDs 804 may include white LEDs 806 ("W"). LEDs 804 may include red LED 808 ("R"). LEDs 804 may include green LEDs 810 ("G"). LEDs 804 may include blue LEDs 812 ("B"). LEDs 804 may include amber LEDs 814 ("A").

LEDs 804 may define a pattern. Board 800 may include other LEDs arranged in the pattern. Board 800 may include LEDs arranged in a different pattern. A pattern may be sequentially repeated.

Figure 9:
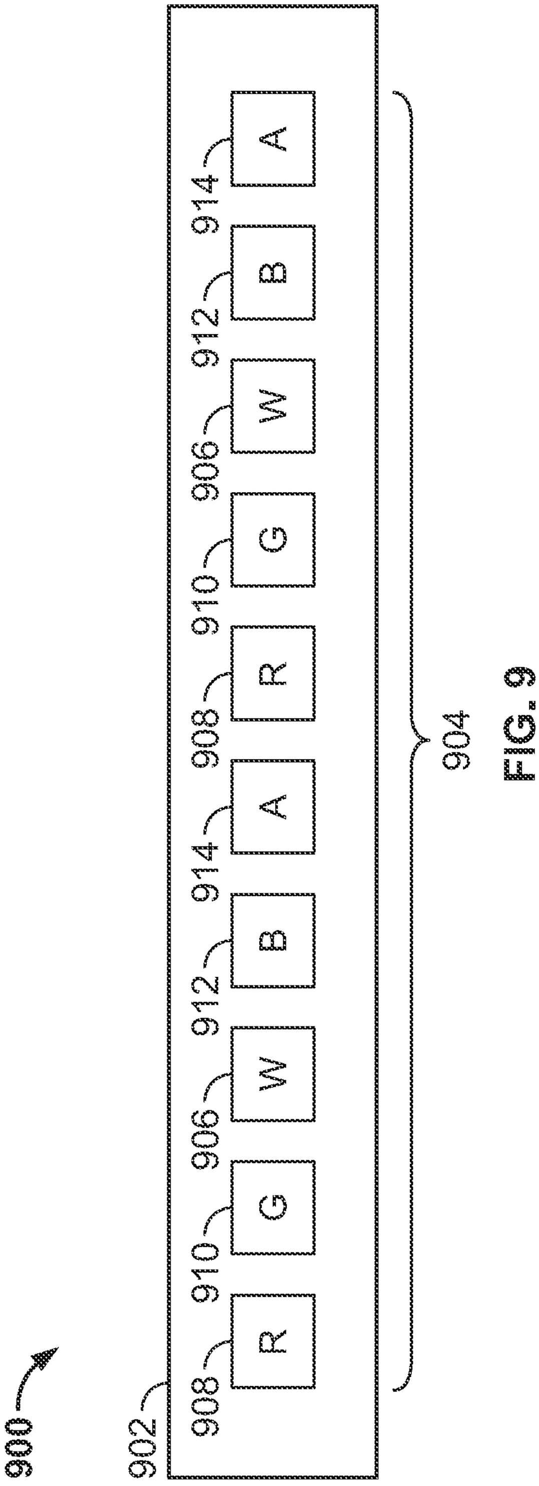
FIG. 9 shows schematically illustrative apparatus in accordance with principles of the invention.

FIG. 9 shows schematically illustrative LED board 900. Board 900 may be disposed in a light source such as 106. Board 900 may have one or more features in common with LED board 132. Board 900 may include LED holder 902. Board 900 may include one or more LEDs 904. LEDs 904 may be arranged in a pattern that is different from the pattern in which LEDs 804 are arranged.

LEDs 904 may include white LEDs 906 ("W"). LEDs 904 may include red LED 908 ("R"). LEDs 904 may include green LEDs 910 ("G"). LEDs 904 may include blue LEDs 912 ("B"). LEDs 904 may include amber LEDs 914 ("A").

LEDs 904 may define a pattern. Board 900 may include other LEDs arranged in the pattern. Board 900 may include LEDs arranged in a different pattern. A pattern may be sequentially repeated.

Figure 10:
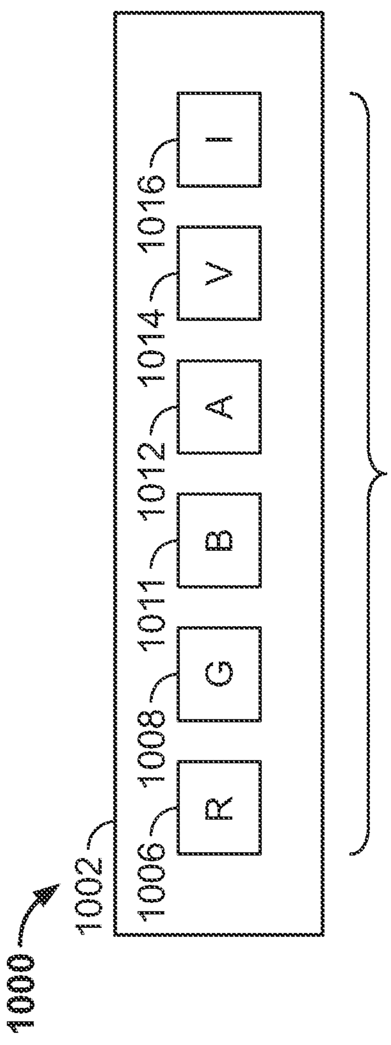
FIG. 10 shows schematically illustrative apparatus in accordance with principles of the invention.

FIG. 10 shows schematically illustrative LED board 1000. Board 1000 may be disposed in a light source such as 106. Board 1000 may have one or more features in common with LED board 132. Board 1000 may include LED holder 1002. Board 1000 may include one or more LEDs 1004.

LEDs 1004 may include red LED 1006 ("R"). LEDs 1004 may include green LED 1008 ("G"). LEDs 1004 may include blue LED 1010 ("B"). LEDs 1004 may include amber LED 1012 ("A"). LEDs 1004 may include violet LED 1014 ("V"). LEDs 1004 may include indigo LED 1016 ("I").

LEDs 1004 may define a pattern. Board 1000 may include other LEDs arranged in the pattern. Board 1000 may include LEDs arranged in a different pattern. A pattern may be sequentially repeated.

Figure 11:
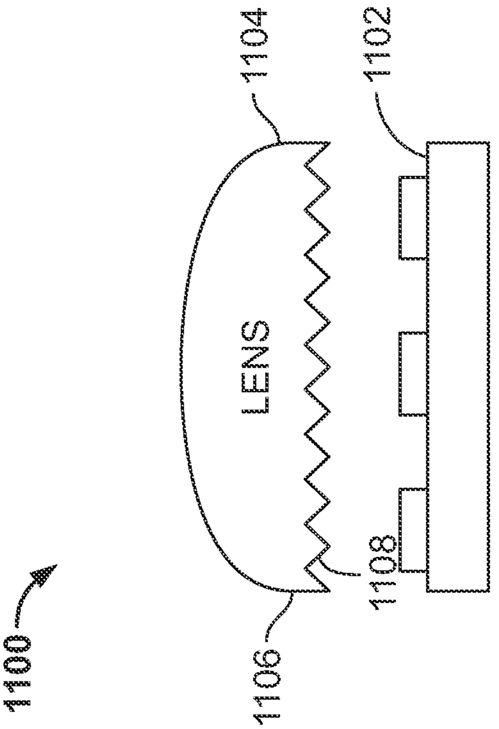
FIG. 11 shows schematically illustrative apparatus in accordance with principles of the invention.

FIG. 11 shows illustrative arrangement 1100 of a projector such as 112. Arrangement 1100 may include LED board 1102. LED board 1102 may be disposed in a light source such as 116. Board 1102 may have one or more features in common with LED board 132. Arrangement 1102 may include lens 1104. Lens 1104 may have one or more features in common with optics 108. Arrangement 1102 may include diffuser 1106 for diffusing light from LED board 1102 before the light enters lens 1104. Diffuser 1106 may have one or more features in common with optics 108. Diffuser 1106 may include surfaces such as 1108. Surfaces 1108 may include facets. Surfaces 1108 may include irregularly shaped faces. Surfaces 1108 may be of monolithic construction with lens 1104. Surfaces 1108 may be set in a layer of material that is not of monolithic construction with lens 1104.

Figure 12:
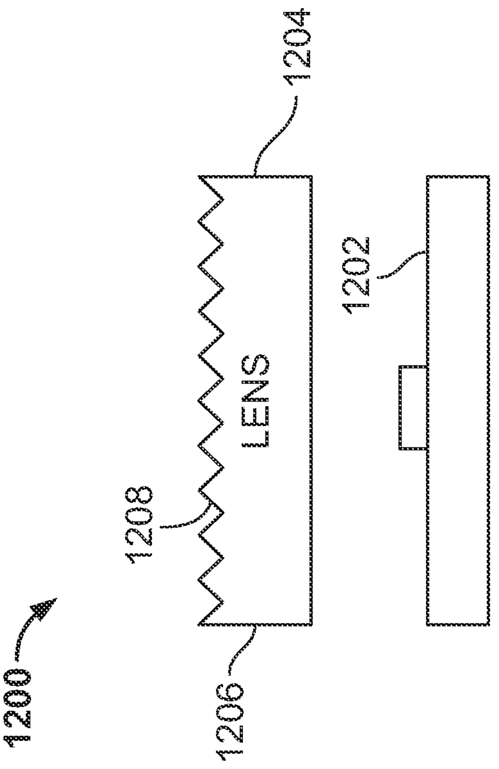
FIG. 12 shows schematically illustrative apparatus in accordance with principles of the invention.

FIG. 12 shows illustrative arrangement 1200 of a projector such as 122. Arrangement 1200 may include LED board 1202. LED board 1202 may be disposed in a light source such as 126. Board 1202 may have one or more features in common with LED board 132. Arrangement 1200 may include lens 1204. Lens 1204 may have one or more features in common with optics 108. Arrangement 1200 may include diffuser 1206 for diffusing light from LED board 1202 as the light emerges from lens 1104. Diffuser 1206 may have one or more features in common with optics 108. Diffuser 1206 may include surfaces such as 1208. Surfaces 1208 may include facets. Surfaces 1208 may include irregularly shaped faces. Facets 1208 may be of monolithic construction with lens 1204. Facets 1208 may be set in a layer of material that is not of monolithic construction with lens 1204.

Figure 13:
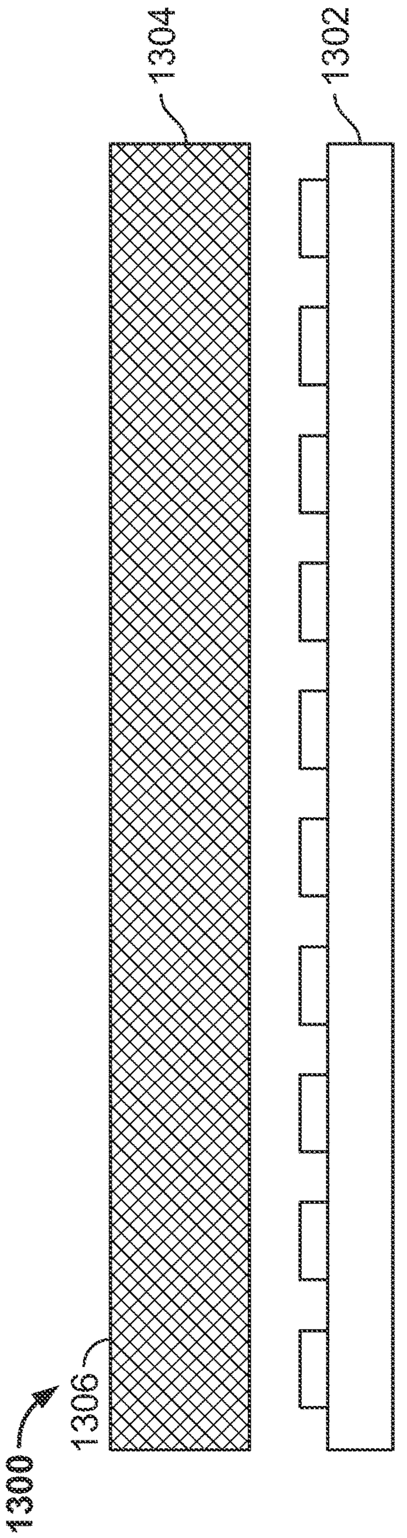
FIG. 13 shows schematically illustrative apparatus in accordance with principles of the invention.

FIG. 13 shows illustrative arrangement 1300 of a projector such as 112. Arrangement 1300 may include LED board 1302. LED board 1302 may be disposed in a light source such as 116. Board 1302 may have one or more features in common with LED board 132. Arrangement 1300 may include lens 1304. Lens 1304 may have one or more features in common with optics 108. Lens 1304 include in its volume diffusive elements 1306 for diffusing light from LED board 1302 as the light propagates through lens 1304. Diffusive elements 1306 may have one or more features in common with optics 108. Diffusive elements 1306 may include facets. Diffusive elements 1306 may include irregularly shaped faces. Diffusive elements 1306 may be of monolithic construction with lens 1304. Facets 1308 may be interlayered within lens 1304.

Figure 14:
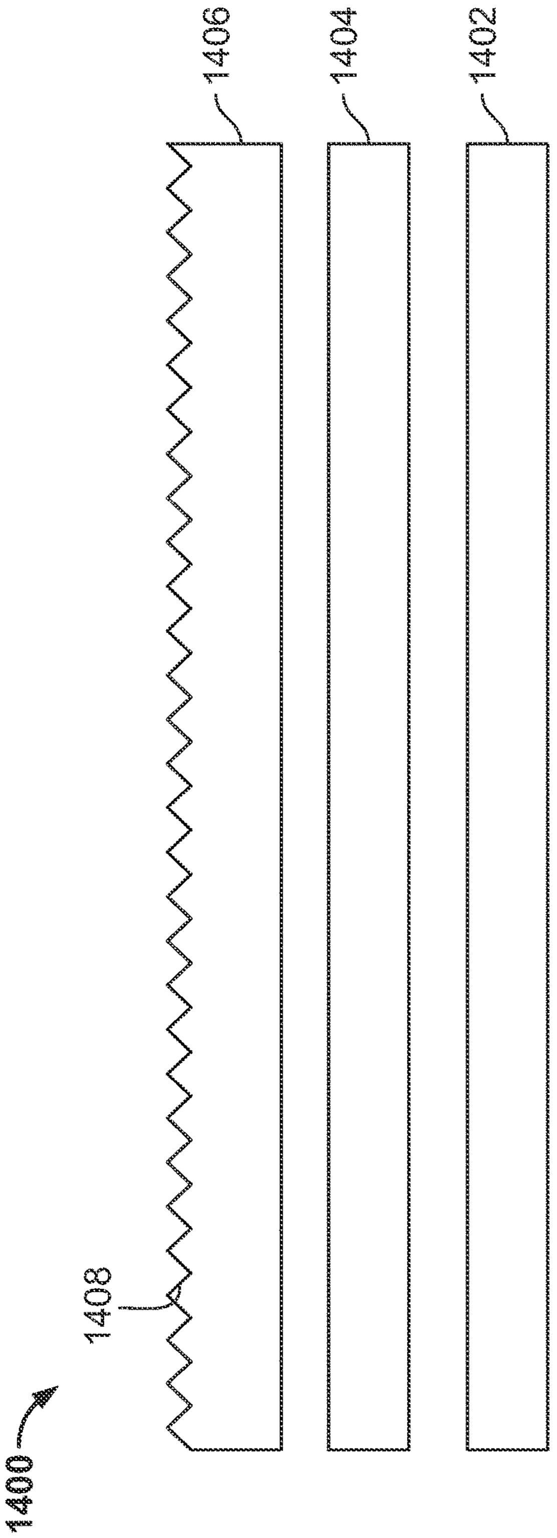
FIG. 14 shows schematically illustrative apparatus in accordance with principles of the invention.

FIG. 14 shows illustrative arrangement 1400 of a projector such as 112. Arrangement 1400 may include LED board 1402. LED board 1402 may be disposed in a light source such as 116. Board 1402 may have one or more features in common with LED board 132. Arrangement 1400 may include dichroic filter 1404. Dichroic filter 1404 may have one or more features in common with optics 108. Arrangement 1400 may include diffuser 1406. Diffuser 1406 may have one or more features in common with optics 108. Diffuser 1406 may diffuse light from LED board 1402 after the light emerges from dichroic filter 1404. Diffuser 1406 may include surfaces such as 1408. Surfaces 1408 may include facets. Surfaces 1408 may include irregularly shaped faces. Surfaces 1408 may be of monolithic construction with diffuser 1406. Surfaces 1408 may be set in a layer of material that is not of monolithic construction with diffuser 1406. Diffuser 1406 may be disposed between board 1402 and dichroic filter 1404.

Figure 15:
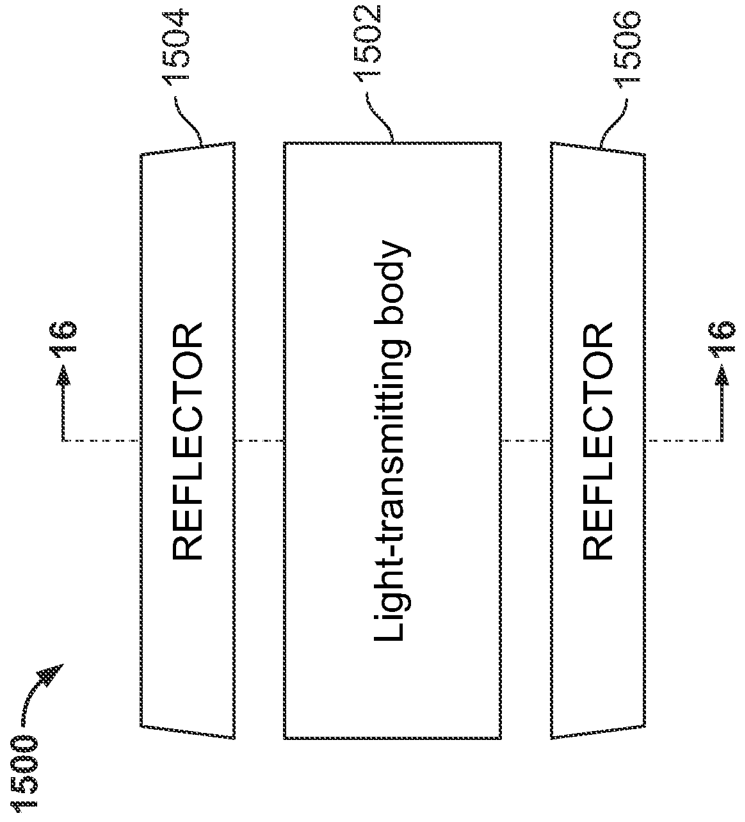
FIG. 15 shows schematically illustrative apparatus in accordance with principles of the invention.

FIG. 15 shows illustrative arrangement 1500. Arrangement 1500 may include a projector (not shown) such as 112. Arrangement 1500 may include light-transmitting body 1502. Light-transmitting body 1502 may have one or more features in common with light-transmitting body 114. Arrangement 1500 may include reflector 1504. Arrangement 1500 may include reflector 1506. One or both of reflectors 1504 and 1506 may have one or more features in common with one or more of reflectors 122, 124, 126, 128 and 130.

Figure 16:
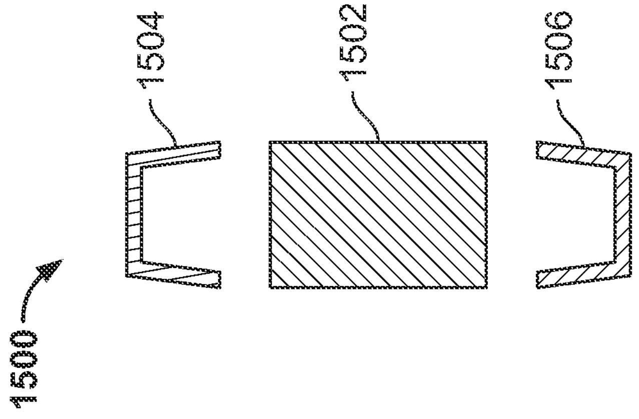
FIG. 16 is a view corresponding to that taken along lines 16-16 of FIG. 15.

FIG. 16 shows arrangement 1500 as if viewed along view lines 16-16 (shown in FIG. 15).

Figure 17:
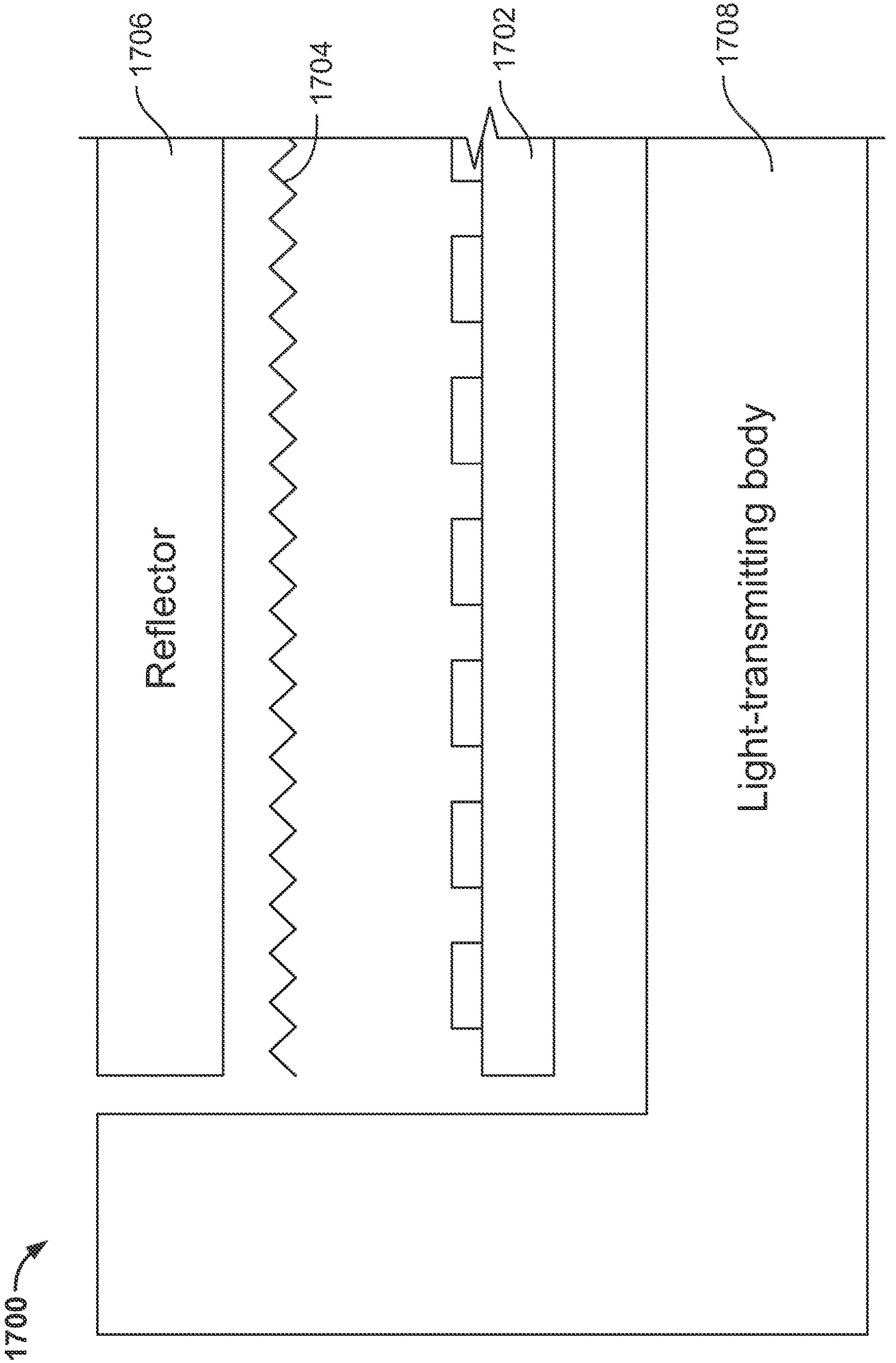
FIG. 17 shows schematically illustrative apparatus in accordance with principles of the invention.

FIG. 17 shows illustrative backlighting arrangement 1700. Arrangement 1700 may include LED board 1702. Board 1702 may be disposed in a light source such as 116. Board 1702 may have one or more features in common with LED board 132.

Arrangement 1700 may include diffusing element 1704. Diffusing element 1704 may have one or more features in common with optics 108. Arrangement 1700 may include reflector 1706. Reflector 1706 may have one or more features in common with one or more of reflectors 122, 124, 126, 128 and 130. Arrangement 1700 may include light-transmitting body 1708. Board 1702 may be opaque to light emitted from board 1702. Thus, light from board 1702 may be blocked from direct radiation to light-transmitting body 1708. Reflector 1706 may be part of or embodied as a light fixture back plate.

Figure 18:
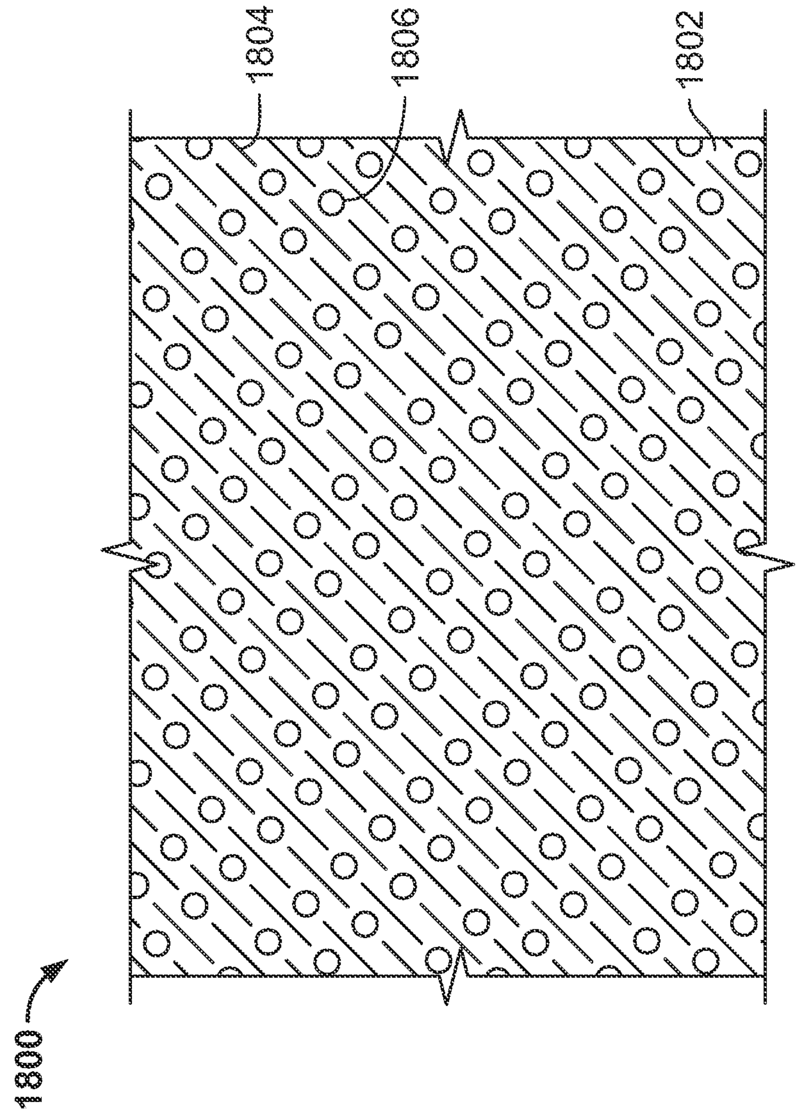
FIG. 18 shows schematically illustrative apparatus in accordance with principles of the invention.

FIG. 18 shows illustrative diffusive structure 1800. Structure 1800 may have one or more features in common with optics 108. Structure 1800 may include solid 1802. Solid 1802 may have a high thermal diffusivity. Solid 1802 may be configured as a heat sink. Structure 1800 may include slits such as slit 1804. Structure 1800 may include perforations such as perforation 1806. Solid 1802 may be translucent. Solid 1802 may have diffusive properties. Slits 1804 may have diffractive properties. Perforations 1806 may permit un-diffused light to propagate through structure 1800.

Figure 19:
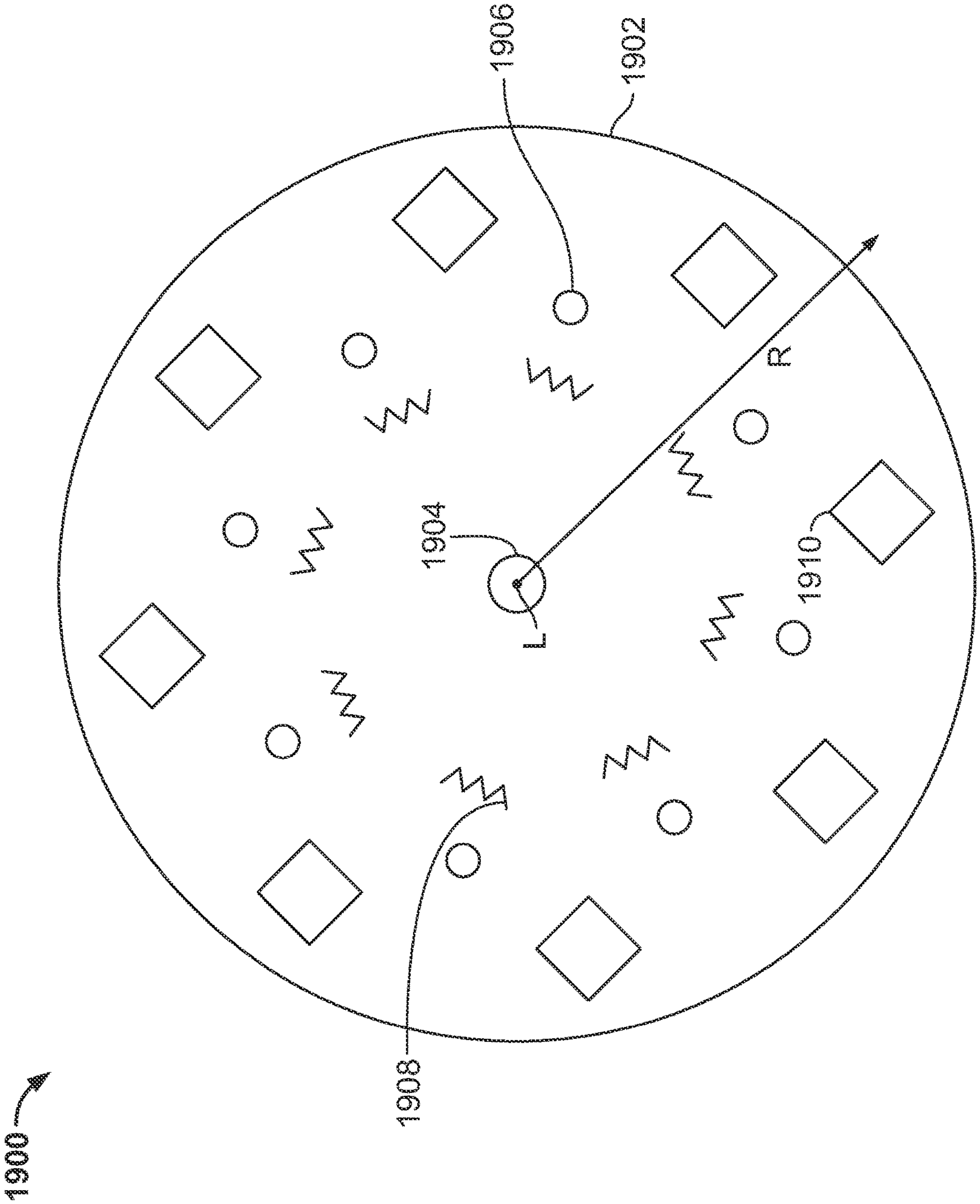
FIG. 19 shows schematically illustrative apparatus in accordance with principles of the invention.

FIG. 19 shows illustrative fixture 1900. Fixture 1900 may include support 1902. Support 1902 may include stem 1904. Stem 1904 may define vertical axis L. Stem 1904 may define radial direction R. Fixture 1900 may include one or more LED boards such as 1906. Boards 1906 may be disposed in a light source such as 116. Boards 1906 may have one or more features in common with LED board 132. Fixture 1900 may include one or more reflectors 1908. Reflectors 1908 may have one or more features in common with one or more of reflectors 122, 124, 126, 128 and 130. Reflectors 1908 may be disposed radially inward from boards 1906. Fixture 1900 may include one or more light-transmitting bodies 1910. Light-transmitting bodies 1910 may be disposed radially inward from boards 1906.

Figure 20:
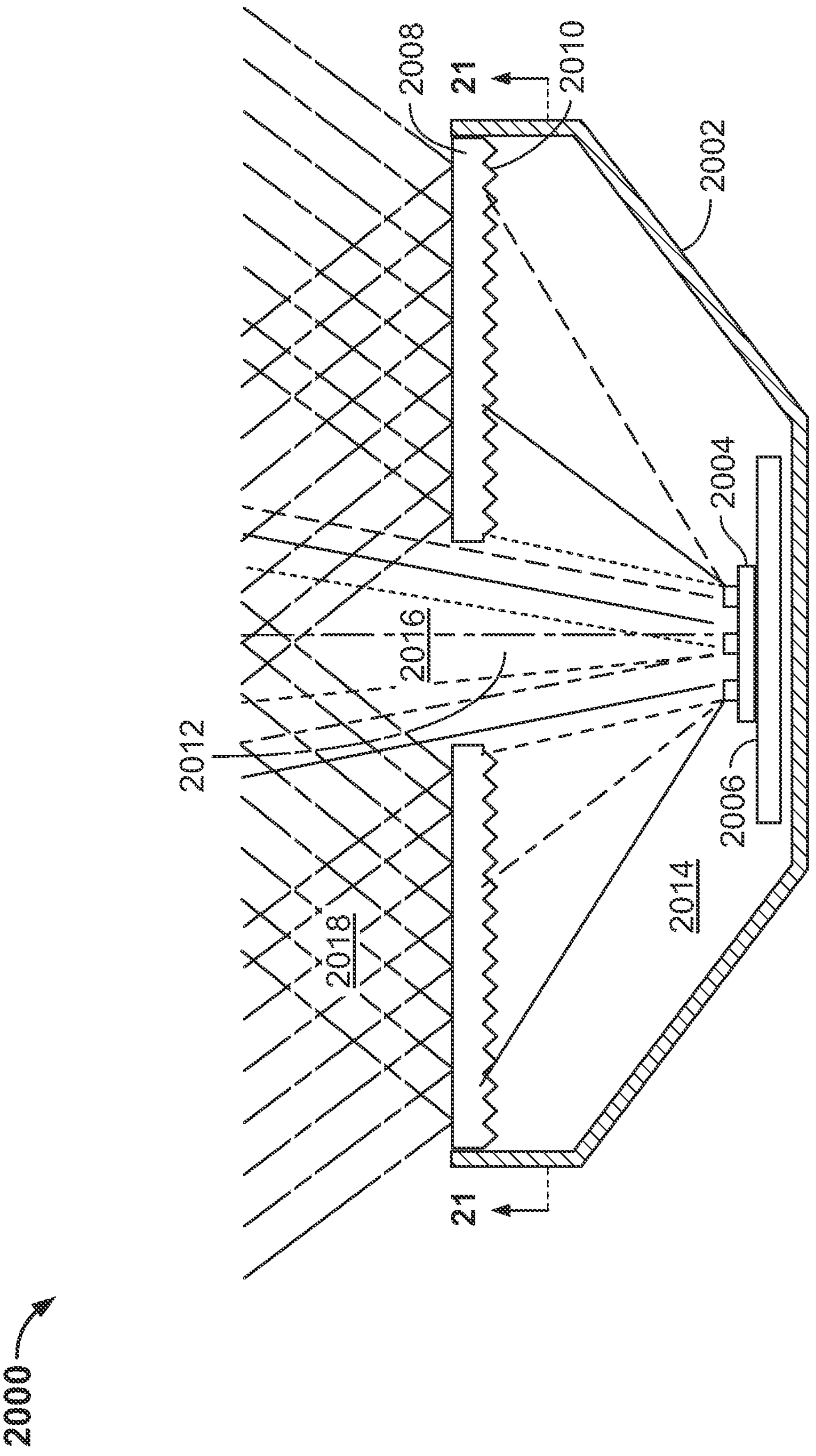
FIG. 20 shows schematically illustrative apparatus in accordance with principles of the invention.

FIG. 20 shows schematically illustrative projector 2000. Projector 2000 may have one or more features in common with projector 102. Projector 2000 may include lamp body 2002. Lamp body 2002 may include a reflector. The reflector may have one or more features in common with one or more of reflectors 122, 124, 126, 128 and 130. Projector 2000 may include LED board 2004. LED board 2004 may have one or more features in common with LED board 132. Projector 2000 may include heat sink 2006. Projector 2000 may include diffusive element 2008. Diffusive element 2008 may have one or more features in common with optics 108. Diffusive element 2008 may include surfaces 2010. Diffusive element 2008 may include aperture 2012. Aperture 2012 may be covered by a lens (not shown). Diffusive element 2008 may have one or more features in common with lens 1104. Diffusive element 2008 may have one or more features in common with lens 1204.

LEDs on LED board 2004 may emit light 2014. Light 2014 may include light of multiple different colors (represented by different line types). The light may be coherent light. Light 2014 may propagate through aperture 2012. Light 2016 may propagate above aperture 2012. Light 2016 may include light 2014. If a lens is present in aperture 2012, light 2016 may include a refraction of light 2014.

Diffusive element 2008 may mix light 2014 and light 2016 to produce light 2018. Light 2016 may correspond to light 110. Light 2018 may correspond to light 120.

Figure 21:
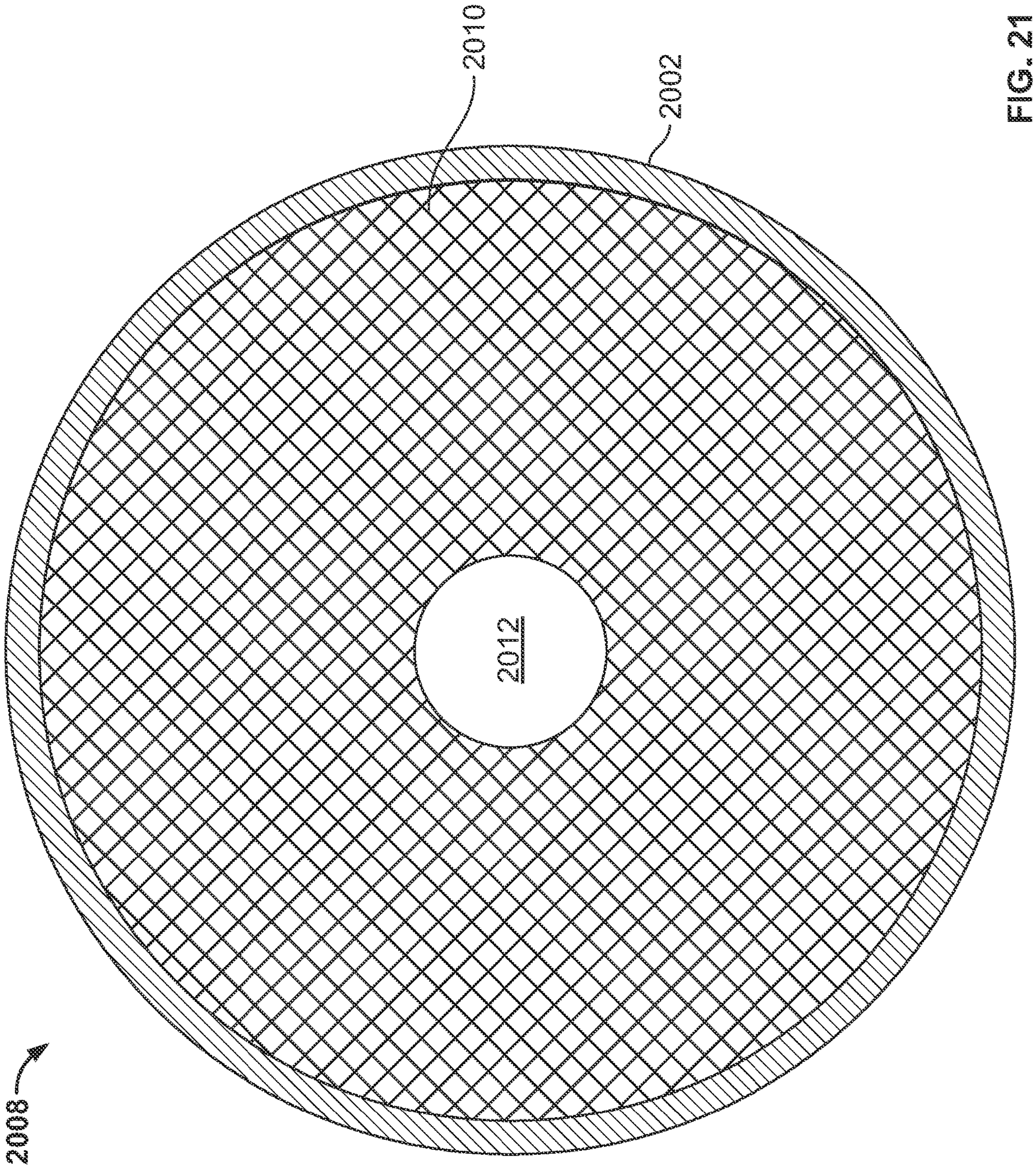
FIG. 21 is a view corresponding to a partial cross-sectional view taken along lines 21-21 of FIG. 20.

FIG. 21 shows schematically diffusive element 2008 as viewed along lines 21-21 in FIG. 20.

Figure 22:
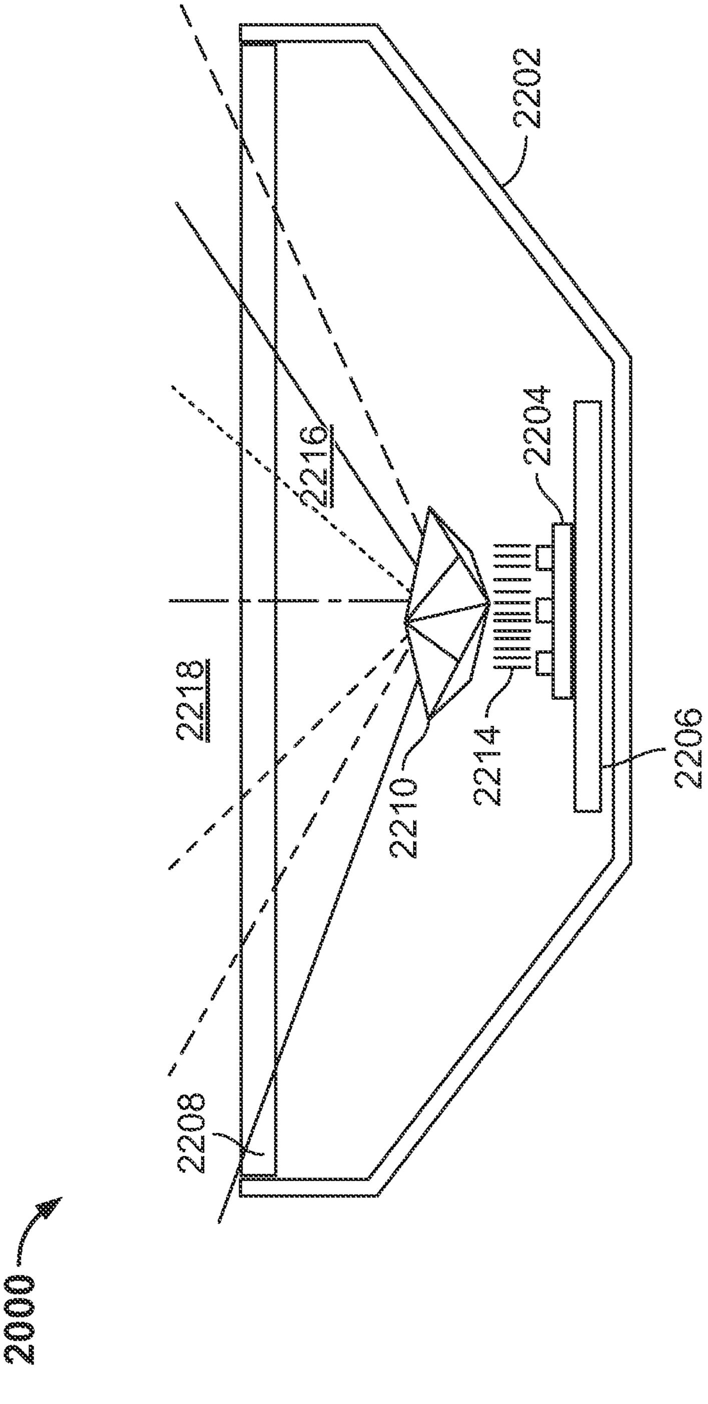
FIG. 22 shows schematically illustrative apparatus in accordance with principles of the invention.

FIG. 22 shows schematically illustrative projector 2200. Projector 2200 may have one or more features in common with projector 102. Projector 2200 may include lamp body 2202. Lamp body 2202 may include a reflector. The reflector may have one or more features in common with one or more of reflectors 122, 124, 126, 128 and 130. Projector 2200 may include LED board 2204. LED board 2204 may have one or more features in common with LED board 132. Projector 2200 may include heat sink 2206. Projector 2200 may include diffusive element 2208. Diffusive element 2208 may be clear. Diffuser 2208 may have one or more features in common with optics 108.

Projector 2200 may include lens 2210. Lens 2210 may have diffusive properties. Lens 2210 may have refractive properties. Lens 2210 may have one or more features in common with optics 108.

LEDs on LED board 2204 may emit light 2214. Light 2214 may include white light. Light 2214 may include incoherent light. Light 2216 may include colored light (represented by different line types) that results from refraction of light 2214 through lens 2210. Light 2218 may propagate above diffusive element 2208. Light 2218 may include light 2216. Light 2218 may include a refraction of light 2014.

Light 2218 may correspond to light 120. White light corresponding to light 112 may be provided by light 2214 that propagates through lens 2210, but is not separated into colored light. White light corresponding to light 112 may be provided by light 2214 that propagates around lens 2210. White light corresponding to light 112 may be provided by a light source that is separate from light 2214. The separate light source may be disposed in projector 2200. The separate light source may be disposed outside of projector 2200.

Figure 23:
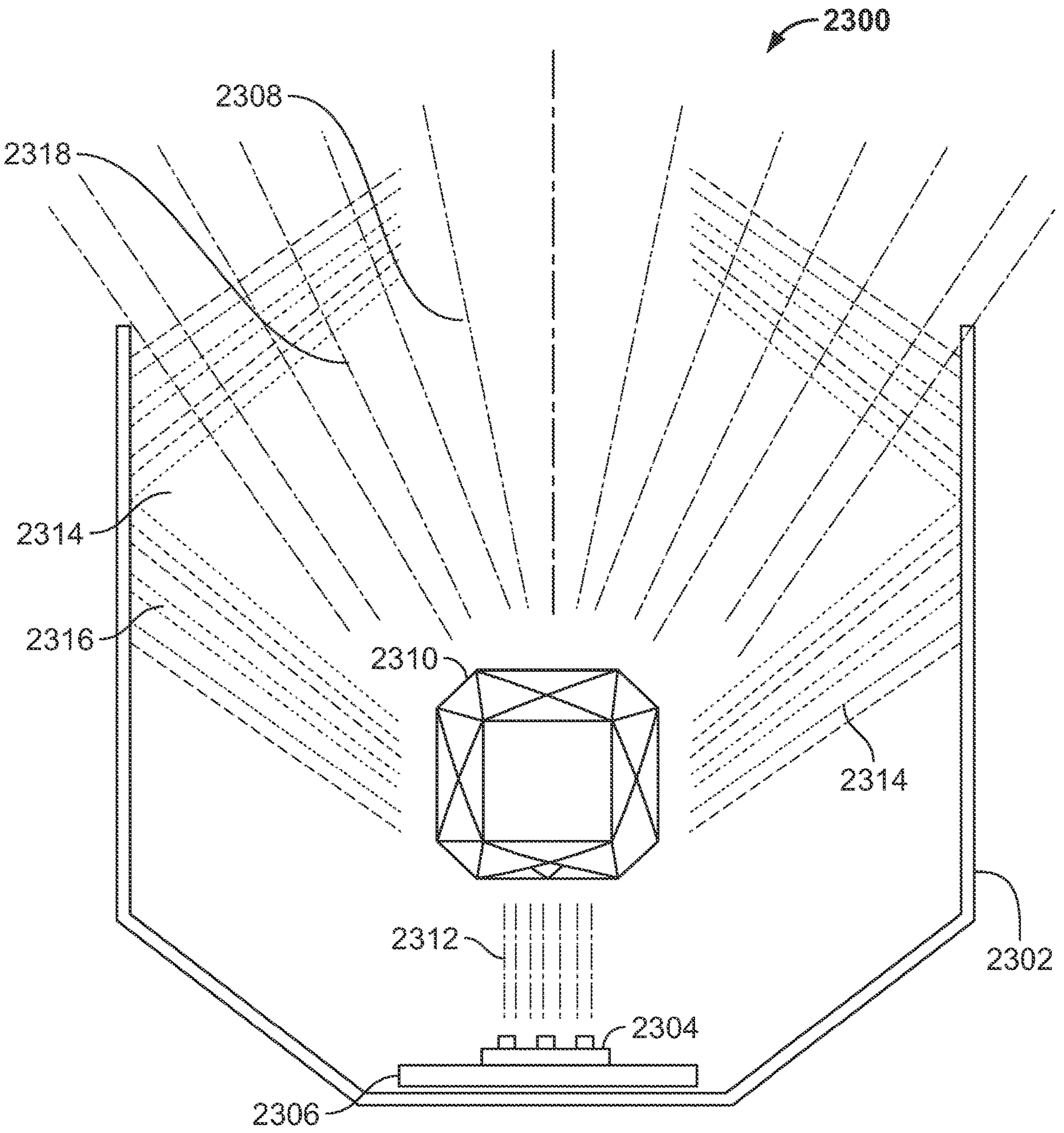
FIG. 23 shows schematically illustrative apparatus in accordance with principles of the invention.

FIG. 23 shows schematically illustrative projector 2300. Projector 2300 may have one or more features in common with projector 102. Projector 2300 may include lamp body 2302. Lamp body 2302 may include a reflector. The reflector may have one or more features in common with one or more of reflectors 122, 124, 126, 128 and 130. Projector 2300 may include LED board 2304. LED board 2304 may have one or more features in common with LED board 132. Projector 2300 may include heat sink 2306. Projector 2300 may include aperture 2308. Projector 2300 may include a diffusive element (not shown) in aperture 2308. The diffusive element may be clear.

Projector 2300 may include lens 2310. Lens 2310 may have diffusive properties. Lens 2310 may have refractive properties. Lens 2310 may have one or more features in common with optics 108.

LEDs on LED board 2304 may emit light 2312. Light 2312 may include white light. Light 2312 may include incoherent light.

Light 2314 may include colored light 2316 (represented by different line types). Colored light 2316 may result from separation of light 2312 by lens 2310.

Light 2314 may include white light 2318. White light 2318 may result from light 2312 that passes through lens 2310, but does not separate into colored light.

Light 2316 may correspond to light 110. Light 2318 may correspond to light 112.

Light 2316 may reflect off lamp body 2302 before exiting through aperture 2308. Light 2318 may reflect off lamp body 2302 before exiting through aperture 2308.

Light 2316 may reflect off lamp body 2302 and a surface of lens 2310 before exiting through aperture 2308. Light 2318 may reflect off lamp body 2302 and a surface of lens 2310 before exiting through aperture 2308.

FIG. 24 shows schematically illustrative decorative light-transmitting body 2400. Light-transmitting body 2400 may have one or more features in common with light-transmitting body 104. A projector (not shown) may provide light such as light 110 and light 112 to light-transmitting body 2400. Light 2402 may emerge from light-transmitting body 2400. Light 2404 may emerge from light-transmitting body 2400. Light 2406 may emerge from light-transmitting body 2400.

Light 2402 may correspond to light 114. Light 2404 may correspond to light 118. Light 2406 may correspond to light 120.

FIG. 24*a* shows schematically illustrative LED light source A2400. Illustrative light source A2400 may have one or more features in common with light source 106. Light source A2400 may include an array of LEDs. The array may be one-dimensional (e.g., along an axis y). The array may be two-dimensional (which may include a 2-D array on a curved surface; along axes x and y, not shown). Each of the LEDs may emit a beam of light. The beam may have an axis $L_{i,j}$, where i indicates a logical column in the array and j indicates a logical row in the array. The light may define an intensity field. The intensity field may have high values at axes $L_{i,j}$. The intensity field may have low values between $L_{i,j}$. The highs and lows may define a variation in intensity across the field. The variation may be quantified as an amplitude.

Illustrative light source A2400 may include LED strips such as A2402. Each of the strips may include one or more LEDs such as A2404. One or more of the LEDs may be a chip-on-board ("COB") LED. LED A2404 may emit a beam of light. The beam may have axis $L_{1,2}$ (coming out of the page), which may be one of numerous $L_{i,j}$ axes corresponding to other LEDs in light source A2404. The LEDs may be arranged with a uniform center-to-center distance. The LEDs may be arranged with a non-uniform center-to-center distance. The center-to-center distance in the y-direction is "a." The LEDs may be arranged with a uniform separation. The LEDs may be arranged with a non-uniform separation. The separation in the y-direction may be "b." "f" may indicate a center-to-center distance between adjacent strips, such as A2406 and A2408. "g" may represent an LED "cell," the center-to-center distance in the y-direction between gaps between the LEDs. "h" may be an LED diameter.

Table 6 lists illustrative ranges which may include a.

TABLE 6

| Illustrative ranges of a. Illustrative ranges of a (mm) | |
|---|---|
| Lower | Upper |
| <4 | 4 |
| 4.5 | 5 |
| 5 | 5.5 |
| 5.5 | 6 |
| 6.5 | 7 |
| 7.5 | 8 |
| 8 | 8.5 |
| 8.5 | 9 |
| 9.5 | 10 |
| 10 | >10 |
| Other suitable lower limits | Other suitable upper limits |

Table 7 lists illustrative ranges which may include b.

TABLE 7

| Illustrative ranges of b. Illustrative ranges of b (mm) | |
|---|---|
| Lower | Upper |
| 0 | .5 |
| .5 | 1 |
| 1 | 1.5 |
| 1.5 | 2 |
| 2 | 2.5 |
| 2.5 | 3 |
| 3 | 3.5 |
| 3.5 | 4 |
| 4 | 4.5 |
| 4.5 | 5 |
| 5 | 5.5 |
| 5.5 | 6 |
| 6.5 | 7 |
| 7.5 | 8 |
| 8 | 8.5 |
| 8.5 | 9 |
| 9.5 | 10 |
| 10 | >10 |
| Other suitable lower limits | Other suitable upper limits |

Table 8 lists illustrative ranges which may include f.

TABLE 8

| Illustrative ranges of f. Illustrative ranges of f (mm) | |
|---|---|
| Lower | Upper |
| 0 | .5 |
| .5 | 1 |
| 1 | 1.5 |
| 1.5 | 2 |
| 2 | 2.5 |
| 2.5 | 3 |
| 3 | 3.5 |
| 3.5 | 4 |
| 4 | 4.5 |
| 4.5 | 5 |
| 5 | 5.5 |
| 5.5 | 6 |
| 6.5 | 7 |
| 7.5 | 8 |
| 8 | 8.5 |
| 8.5 | 9 |
| 9.5 | 10 |
| 10 | >10 |
| Other suitable lower limits | Other suitable upper limits |

Table 9 lists illustrative ranges which may include h.

TABLE 9

| Illustrative ranges of h. Illustrative ranges of h (mm) | |
|---|---|
| Lower | Upper |
| <1 | 1 |
| 1 | 1.5 |
| 1.5 | 2 |
| 2 | 2.5 |
| 2.5 | 3 |
| 3 | 3.5 |
| 3.5 | 4 |
| 4 | 4.5 |
| 4.5 | 5 |
| 5 | 5.5 |
| 5.5 | 6 |
| 6.5 | 7 |
| 7.5 | 8 |
| 8 | 8.5 |
| 8.5 | 9 |
| 9.5 | 10 |
| 10 | >10 |
| Other suitable lower limits | Other suitable upper limits |

FIG. 25 shows illustrative grain 2500. Top, elevational and bottom views are shown. Grain 2500 may have a diameter D. Grain 2500 may have a height H. Grain 2500 may have a depth U below girdle G. Grain 2500 may be a grain that has no facets, one facet or more than one facet. Grain 2500 may include crown facets CF. Grain 2500 may include crown break facets CBF. Grain 2500 may include pavilion facets PF. Grain 2500 may include pavilion break facets PBF. Grain 2500 may be a grain that does not include a table. Grain 2500 may include crown pyramid 2506. Grain 2500 may include pavilion pyramid 2508. Grain 2500 may be bi-pyramidal. Grain 2500 may include one or more star, kite, girdle or culet facets.

Crown 2502 may include 3, 4, 5, 6, 7, 8, 9, 10 or any other suitable number of crown facets or crown break facets. Pavilion 2504 may include 3, 4, 5, 6, 7, 8, 9, 10 or any other suitable number of pavilion facets or pavilion break facets. Pavilion facets may be angularly offset from corresponding crown facets by angle α. Table 10 lists illustrative ranges of angles that may include α.

TABLE 10

Illustrative values of angle α.
Illustrative values of angle α (° of arc)

| Lower | Upper |
|---|---|
| <11.3 | 11.3 |
| 11.3 | 12 |
| 12 | 12.9 |
| 12.9 | 13.8 |
| 13.8 | 15 |
| 15 | 16.4 |
| 16.4 | 18 |
| 18 | 20 |
| 20 | 22.5 |
| 22.5 | 25.7 |
| 25.7 | 30 |
| 30 | 36 |
| 36 | 45 |
| 45 | 60 |
| 60 | >60 |
| Other suitable lower limits | Other suitable upper limits |

Pyramid angle β may indicate an angle of a crown or pavilion facet relative to axis c. Crown 2502 and pavilion 2504 may have the same pyramid angle. Crown 2502 and pavilion 2504 may have different pyramid angles. The pyramid angle may be 49.8°. Table 11 lists illustrative ranges that may include pyramid angle β.

TABLE 11

Illustrative values of angle β.
Illustrative values of angle β (° of arc)

| Lower | Upper |
|---|---|
| >50 | 50 |
| 50 | 49 |
| 49 | 48 |
| 48 | 47 |
| 47 | <47 |
| Other suitable lower limits | Other suitable upper limits |

Table 12 lists illustrative dimensions of grains such as 2500 for different sizes of grain 2500.

TABLE 12

Illustrative dimensions of grain 2500.

| | D | | H | | U | |
|---|---|---|---|---|---|---|
| Size | D (mm) | Tolerance (mm) | H (mm) | Tolerance (mm) | U (mm) | Tolerance (mm) |
| 2.5 | 1.325 | ±0.025 | 0.88 | ±0.08 | 0.57 | ±0.01 |
| 3 | 1.375 | ±0.025 | 0.92 | ±0.09 | 0.59 | ±0.01 |
| 3.5 | 1.45 | ±0.05 | 0.95 | ±0.10 | 0.62 | ±0.02 |
| 4 | 1.55 | ±0.05 | 1.00 | ±0.10 | 0.66 | ±0.02 |
| 4.5 | 1.65 | ±0.05 | 1.10 | ±0.10 | 0.71 | ±0.02 |
| 5 | 1.75 | ±0.05 | 1.15 | ±0.10 | 0.75 | ±0.02 |
| 5.5 | 1.85 | ±0.05 | 1.20 | 10.10 | 0.79 | ±0.02 |
| 6 | 1.95 | ±0.05 | 1.30 | ±0.10 | 0.84 | ±0.02 |
| 6.5 | 2.05 | ±0.05 | 1.35 | ±0.10 | 0.88 | ±0.02 |
| 7 | 2.15 | ±0.05 | 1.40 | ±0.10 | 0.92 | ±0.02 |
| 7.5 | 2.25 | ±0.05 | 1.50 | ±0.10 | 0.96 | ±0.02 |
| 8 | 2.35 | ±0.05 | 1.55 | ±0.10 | 1.01 | ±0.02 |
| 8.5 | 2.45 | ±0.05 | 1.60 | ±0.10 | 1.05 | ±0.02 |
| 9 | 2.55 | ±0.05 | 1.70 | ±0.10 | 1.09 | ±0.02 |
| 9.5 | 2.65 | ±0.05 | 1.75 | ±0.10 | 1.14 | ±0.02 |
| 10 | 2.75 | ±0.05 | 1.80 | ±0.10 | 1.18 | ±0.02 |
| 11 | 2.85 | ±0.05 | 1.90 | ±0.10 | 1.22 | ±0.02 |
| 11.5 | 2.95 | ±0.05 | 1.95 | ±0.10 | 1.27 | ±0.02 |
| 12 | 3.10 | ±0.10 | 2.03 | ±0.13 | 1.33 | ±0.04 |
| 13 | 3.25 | ±0.05 | 2.15 | ±0.10 | 1.39 | ±0.02 |
| 13.5 | 3.35 | ±0.05 | 2.20 | ±0.10 | 1.44 | ±0.02 |
| 14 | 3.45 | ±0.05 | 2.25 | ±0.10 | 1.48 | ±0.02 |
| 14.5 | 3.55 | ±0.05 | 2.35 | ±0.10 | 1.52 | ±0.02 |
| 15 | 3.65 | ±0.05 | 2.40 | ±0.10 | 1.57 | ±0.02 |
| 15.5 | 3.75 | ±0.05 | 2.45 | ±0.10 | 1.61 | ±0.02 |
| 16 | 3.90 | ±0.10 | 2.55 | ±0.15 | 1.67 | ±0.04 |
| 17 | 4.10 | ±0.10 | 2.70 | ±0.15 | 1.76 | ±0.04 |
| 18 | 4.30 | ±0.10 | 2.85 | ±0.15 | 1.85 | ±0.04 |
| 19 | 4.50 | ±10.10 | 2.95 | ±0.15 | 1.93 | ±0.04 |
| 20 | 4.70 | ±0.10 | 3.10 | ±0.15 | 2.02 | ±0.04 |
| 21 | 4.85 | ±0.05 | 3.20 | ±0.15 | 2.08 | ±0.02 |
| 22 | 5.00 | ±0.10 | 3.30 | ±0.15 | 2.15 | ±0.04 |
| 23 | 5.175 | ±0.75 | 3.40 | ±0.15 | 2.22 | ±0.03 |
| 24 | 5.35 | ±0.10 | 3.50 | ±0.15 | 2.30 | ±0.04 |
| 25 | 5.525 | ±0.75 | 3.65 | ±0.15 | 2.37 | ±0.03 |
| 26 | 5.70 | ±0.10 | 3.75 | ±0.15 | 2.45 | ±0.04 |
| 27 | 5.90 | ±0.10 | 3.90 | ±0.15 | 2.53 | ±0.04 |
| 28 | 6.75 | ±0.75 | 4.00 | ±0.15 | 2.61 | ±0.03 |
| 29 | 6.25 | ±0.10 | 4.10 | ±0.15 | 2.68 | ±0.04 |
| 30 | 6.425 | ±0.75 | 4.20 | ±0.15 | 2.76 | ±0.03 |

The grains may include one or more grains such as grain 2500. The grains may include grains of one or more different sizes. Different grains may include different facets.

Table 13 lists illustrative materials that may be included a grain.

TABLE 13

Illustrative materials that may be included in a grain.

| Illustrative material |
|---|
| Silica sand |
| Quartz sand |
| Sodium |
| Potassium carbonate |
| Minium |
| Red lead |
| Sodium carbonate |
| Potash |
| Other suitable materials |

FIG. 26 shows schematically illustrative arrangement 2600 for diffusing light. Arrangement 2600 may include LED light source 2602. LED light source 2602 may have one or more features in common with light source 106 or arrangement A2400. Arrangement 2600 may include diffusive element 2604.

LED light source 2602 may be attached to a light fixture (not shown). Diffusive element 2604 may be attached to the light fixture. LED light source 2602 may be offset from diffuser 2604 by an offset "q." Table 14 lists illustrative ranges that may include offset q.

TABLE 14

Illustrative ranges that may include offset q. Illustrative ranges that may include offset q (mm)

| Lower | Upper |
|---|---|
| 0 | 1 |
| 1 | 2 |
| 2 | 3 |
| 3 | 4 |
| 4 | 5 |
| 5 | 10 |
| 10 | 20 |
| 20 | 50 |
| 50 | 100 |
| 100 | >100 |
| Other suitable lower limits | Other suitable upper limits |

Diffusive element 2604 may have one or more features in common with optics 108. Diffusive element 2604 may include grains 2606. Diffusive element 2604 may include substrate 2608. Grains 2606 may have one or more features in common with grain 2500. Diffusive element 2604 may include bonding material 2610. Bonding material 2610 may fix grains 2606 to substrate 2608. LED light source 2602 may project light at diffusive element 2604. Diffusive element 2604 may include side 2612 facing LED light source 2602. Grains 2606 in aggregate may define side 2612. Diffusive element 2604 may include side 2614 facing away from LED light source 2602. Substrate 2608 may define side 2614. One or both of sides 2612 and 2614 may be planar. One or both of sides 2612 and 2614 may be curved. Substrate 2608 may have a plate or plate-like form.

Grains 2606 may be applied to substrate 2608 by applying glue or bonding agent to substrate 2608 and then disposing grains 2606 on the glue or bonding agent. The grains may be oriented in an ordered fashion. The grains may be oriented in an unordered fashion. The grains may be oriented with a crown face parallel to substrate 2608. The grains may be oriented with a pavilion face parallel to substrate 2608. The grains may be distributed in an ordered fashion. The grains may be distributed in an unordered fashion.

The grains may be applied to substrate 2608 with a grain density. Table 15 lists illustrative ranges that may include the grain density.

TABLE 15

Illustrative ranges that may include the grain density. Illustrative ranges that may include the grain density (grain/cm$^2$)

| Lower | Upper |
|---|---|
| <9 | 10 |
| 10 | 11 |
| 11 | 12 |
| 12 | 13 |
| 13 | 14 |
| 14 | 15 |
| 15 | >15 |
| Other suitable lower limits | Other suitable upper limits |

A facet density may be calculated as a number of facets per grain times a number of grains per unit area.

Light from light source 2602 may be incident on side 2612. The light may be transmitted through grains 2606. Grains 2606 may diffuse the light. The diffused light may pass substrate 2608. The light may exit substrate 2608 via side 2614.

FIG. 27 shows schematically arrangement 2600 in cross-section.

FIG. 27A shows arrangement A2700. In arrangement A2700 diffusive element 2604 may be oriented so that grains 2606 face away from LED light source 2602.

FIG. 28 illustrates an effect of grains 2606 on light from LED light source 2602. $I_L$ (broken line, curves) is intensity of light, from LED light source 2602, as measured, for example before incidence on side 2612. AVE($I_L$) (broken line, flat) is the spatial average of $I_L$. $I_G$ (solid line, curves) is intensity of light exiting grains 2606. AVE($I_G$) (solid line, flat) is the spatial average intensity of $I_G$.

$I_{REF}$ is intensity of light exiting a reference diffuser (not shown) after a light such as $I_L$ is incident on the reference diffuser. AVE($I_{REF}$) is the spatial average intensity of $I_{REF}$. The reference diffuser may include a diffuser such as a polymer (e.g., acrylic) or glass diffuser.

Peak $P_L$ of $I_L$ may correspond to one of the $L_{i,j}$ axes of light source 2602, cell g of arrangement light source 2602, and corresponding region g' of diffusive element 2604. Grains 2606 may give rise to peaks $P_{Gk}$. Five peaks $P_{Gk}$ are shown. Table 16 lists ranges that may include the number of peaks $P_{Gk}$.

TABLE 16

Illustrative ranges that include the number of peaks $P_{Gk}$. Illustrative ranges that may include the number of peaks $P_{Gk}$

| Lower | Upper |
|---|---|
| 1 | 2 |
| 2 | 3 |
| 3 | 4 |
| 4 | 5 |
| 5 | 6 |
| 6 | 7 |
| 7 | 8 |
| 8 | 9 |
| 9 | 10 |
| 10 | 100 |
| 100 | 1000 |
| 1000 | >1000 |
| Other suitable lower limits | Other suitable upper limits |

The number and form of peaks $P_{Gk}$ may vary with viewing angle. The number and form of peaks $P_{Gk}$ may vary with wavelength.

Loss of light energy through grains 2606 may be represented as a ratio of AVE($I_G$)/AVE($I_L$). The loss may increase with the number of grain layers. Loss of light energy through substrate 2608 may be represented as a ratio of AVE($I_S$)/AVE($I_L$). The loss may increase with the thickness of substrate 2608. Loss of light energy through the reference diffuser may be represented as a ratio of AVE($I_{ref}$)/AVE($I_L$).

Table 17 lists illustrative ranges that may include the foregoing ratios.

TABLE 17

Illustrative ranges that include the foregoing ratios.

| AVE($I_G$)/AVE($I_L$) | | AVE($I_s$)/AVE($I_L$) | | AVE($I_{ref}$)/AVE($I_L$) | |
|---|---|---|---|---|---|
| Upper | Lower | Upper | Lower | Upper | Lower |
| >0.99 | 0.99 | >0.99 | 0.99 | >0.9 | 0.9 |
| 0.99 | 0.98 | 0.99 | 0.98 | 0.9 | 0.8 |
| 0.98 | 0.97 | 0.98 | 0.97 | 0.8 | 0.7 |
| 0.97 | 0.95 | 0.97 | 0.95 | 0.7 | 0.6 |
| 0.95 | 0.9 | 0.95 | 0.9 | 0.6 | 0.5 |
| 0.9 | 0.85 | 0.9 | 0.85 | 0.5 | 0.4 |
| 0.85 | 0.8 | 0.85 | 0.8 | 0.4 | 0.3 |
| 0.8 | 0.75 | 0.8 | 0.75 | 0.3 | <0.3 |
| 0.75 | 0.7 | 0.75 | 0.7 | | |
| 0.7 | <0.7 | 0.7 | <0.7 | | |
| Other suitable upper limits | Other suitable lower limits | Other suitable upper limits | Other suitable lower limits | Other suitable upper limits | Other suitable lower limits |

FIG. 29 shows schematically illustrative arrangement 2900 for diffusing light. Arrangement 2900 may include LED light source 2902. LED light source 2902 may have one or more features in common with one or both of light source 106 and light LED light source 2602. Arrangement 2900 may include diffusive element 2904. Diffusive element 2904 may have one or more features in common with one or both of optics 108 and diffusive element 2604. Diffusive element 2904 may include grains 2906. Diffusive element 2904 may include substrate 2908. Grains 2906 may have one or more features in common with grain 2500. Diffusive element 2904 may include bonding material 2910. Bonding material 2910 may fix grains 2906 to substrate 2908. LED light source 2902 may project light at diffusive element 2904.

Diffusive element 2904 may include side 2912 facing LED light source 2902. Grains 2906 in aggregate may define side 2912. Side 2912 may follow edge 2913 of substrate 2908. Diffusive element 2904 may include side 2914. Side 2914 may be perpendicular to edge 2913. Side 2914 may be oblique to edge 2913. Diffusive element 2904 may include a second side (not shown; behind substrate 2908). The second side may be parallel to side 2914. Substrate 2908 may define one or both of side 2914 and the second side. One or both of sides 2912 and 2914 may be planar. One or both of sides 2912 and 2914 may be curved. Substrate 2908 may have a plate or plate-like form.

Light from light source 2902 may be incident on side 2912. The light may be transmitted through grains 2906. Grains 2906 may diffuse the light. The diffused light may pass into substrate 2908. The light may exit substrate 2908 via one or both of side 2914 and the second side. Arrangement 2900 may include an opaque layer along one or both of side 2914 and the second side. The opaque layer may include a reflector. The reflector may be configured to reflect light from substrate 2908 back into substrate 2908.

The intensity variations and averages shown in FIG. 28 may apply analogously to arrangement 2900 with side 2912 in place of side 2612 and one or both of sides 2914 and the second side in place of side 2614. (When both sides are considered, each side would be expected to account for half of the overall exiting intensity.)

FIG. 30 shows schematically arrangement 2900 in cross-section.

FIG. 31 shows schematically illustrative arrangement 3100 for diffusing light. Arrangement 3100 may have one or more features in common with arrangement 2600. Arrangement 3100 may include LED light source 3102. LED light source 3102 may have one or more features in common with one or both of light source 106 and light LED light source 2602. Arrangement 3100 may include diffusive element 3104. Diffusive element 3104 may have one or more features in common with one or both of optics 108 and diffusive element 2604. Diffusive element 3104 may include grains 3106. Diffusive element 3104 may include substrate 3108. Grains 3106 may have one or more features in common with grain 2500. LED light source 3102 may project light at diffusive element 3104.

Diffusive element 3104 may include side 3112 facing LED light source 3102. Grains 3106 in aggregate may define side 3112. Grains 3106 in aggregate may define side 3114.

Substrate 3108 may include wall 3116. Wall 3116 may define region 3118. Grains 3106 may be disposed in region 3118. Grains 3106 may be disposed in region 3118 as loose fill. Grains 3106 may be bonded to each other. Arrangement 3100 may include a support (not shown) at the bottom of region 3118 to support grains 3106. The support may be fixed to substrate 3108. The support may be translucent.

Light from light source 3102 may be incident on side 3112. The light may be transmitted through grains 3106. Grains 3106 may diffuse the light. Substrate 3108 may transmit the diffused light. Substrate 3108 may be configured to not transmit the diffused light. The light may exit grains 3106 via one or both of sides 3112 and 3114. Arrangement 3100 may include an opaque layer along one or both of sides 3112 and 3114. The opaque layer may include a reflector. The reflector may be configured to reflect light from substrate 3108 into region 3118. Light source 3102 may be disposed in region 3118. Light source 3102 may be disposed beneath the opaque layer.

The intensity variations and averages shown in FIG. 28 may apply analogously to arrangement 3100.

FIG. 32 shows schematically a partial cross section of illustrative arrangement 3100.

FIG. 33 shows schematically illustrative arrangement 3300 for diffusing light. Arrangement 3300 may have one or more features in common with arrangement 2600. Arrangement 3300 may include LED light source 3302. LED light source 3302 may have one or more features in common with one or both of light source 106 and light LED light source 2602. Arrangement 3300 may include diffusive element 3304. Diffusive element 3304 may have one or more features in common with one or both of optics 108 and diffusive element 2604. Diffusive element 3304 may include grains 3306. Diffusive element 3304 may include substrate 3308. Grains 3306 may have one or more features in common with grain 2500. LED light source 3302 may project light at diffusive element 3304.

Diffusive element 3304 may include side 3312 facing LED light source 3302. Grains 3306 in aggregate may define side 3312.

Substrate 3308 may include wall 3316. Wall 3316 may define region 3318. Grains 3306 may be disposed in region 3318. Grains 3306 may be disposed in region 3318 as loose fill. Grains 3306 may be bonded to each other. Arrangement 3300 may include a support (not shown) at the bottom of region 3318 to support grains 3306. The support may be fixed to substrate 3308. The support may be translucent.

Light from light source 3302 may be transmitted through substrate 3308. The light may be incident on side 3312. The light may be transmitted through grains 3306. Grains 3306 may diffuse the light. Substrate 3308 may transmit the diffused light. Substrate 3308 may be configured to not transmit the diffused light. The light may exit grains 3306 via one or both of sides 3320 and 3322. Arrangement 3300 may include an opaque layer along one or both of sides 3312, 3320 and 3322. The opaque layer may include a reflector. The reflector may be configured to reflect light into region 3318.

The intensity variations and averages shown in FIG. 28 may apply analogously to arrangement 3300.

FIG. 34 shows schematically illustrative arrangement 3400 for diffusing light. Arrangement 3400 may include LED light source 3302. Arrangement 3400 may include diffusive element 3304. Arrangement 3400 may include opaque layer 3402. Opaque layer 3402 may include a reflector. The reflector may be configured to reflect light from grains 3306 into region 3318.

The intensity variations and averages shown in FIG. 28 may apply analogously to arrangement 3400.

FIG. 35 shows schematically illustrative arrangement 3500 for diffusing light. Arrangement 3500 may have one or more features in common with arrangement 2600. Arrangement 3500 may include LED light source 3502. LED light source 3502 may have one or more features in common with one or both of light source 106 and light LED light source 2602. Arrangement 3500 may include diffusive element 3504. Arrangement 3400 may include opaque layer 3402. Opaque layer 3402 may include a reflector. The reflector may be configured to reflect light from grains 3306 into region 3318.

Light source 3502 may emit light that is incident on side 3322. Grains 3306 may diffuse the light. The light may reflect off opaque layer 3402. The light may return through grains 3306 and exit through side 3322.

FIG. 36 shows schematically illustrative arrangement 3600 for diffusing light. Arrangement 3600 may have one or more features in common with arrangement 2600. Arrangement 3600 may include LED light source 3602. LED light source 3602 may have one or more features in common with one or both of light source 106 and light LED light source 2602. Arrangement 3600 may include diffusive element 3604. Diffusive element 3604 may have one or more features in common with one or both of optics 108 and diffusive element 2604. Diffusive element 3604 may include grains 3606. Diffusive element 3604 may include substrate 3608. Grains 3606 may have one or more features in common with grain 2500. LED light source 3602 may project light at diffusive element 3604.

Diffusive element 3604 may include side 3612 facing LED light source 3602. Grains 3606 in aggregate may define side 3612.

Substrate 3608 may include wall 3616. Substrate 3608 may include wall 3618. Walls 3616 and 3618 may define recess 3620. Grains 3606 may be disposed in recess 3620. Grains 3606 may be disposed in recess 3620 as loose fill. Grains 3606 may be bonded to each other. Substrate 3608 may include a support (not shown) at the bottom of recess 3620 to support grains 3606. The support may be fixed to substrate 3608. The support may be annular. Region 2622 may be a region that has not grains. The support may be translucent.

Light from light source 3602 may be transmitted through substrate 3608. The light may be incident on side 3612. The light may be transmitted through grains 3606. Grains 3606 may diffuse the light. Substrate 3608 may transmit the diffused light. Substrate 3608 may be configured to not transmit the diffused light. The light may exit grains 3606 via one or both of the top and bottom annular openings of recess 3620.

The intensity variations and averages shown in FIG. 28 may apply analogously to arrangement 3600.

FIG. 37 shows schematically a partial cross section of illustrative arrangement 3600.

FIG. 38 shows schematically illustrative arrangement 3800 for diffusing light. Arrangement 3800 may include LED light source 3602. Arrangement 3800 may include diffusive element 3604. Arrangement 3800 may include opaque layer 3802. Opaque layer 3802 may include a reflector. The reflector may be configured to reflect light from grains 3606 into region 3620. The reflector may be configured to reflect light from grains 3606 into region 3622.

The intensity variations and averages shown in FIG. 28 may apply analogously to arrangement 3800.

FIG. 39 show illustrative light fixture 3900. Fixture 3900 may include canopy 3902. Fixture 3900 may include supports 3904. Fixture 3900 may include substrate 3906. Fixture 3900 may include enclosure 3908. Fixture 3900 may include an LED light source in enclosure 3908. Fixture 3900 may include grains (not shown) on substrate 3906 inside enclosure 3908. The arrangement of the LED light source, the grains and the substrate may correspond to that shown in FIG. 27 when fixture 3900 is viewed along view lines 27-27.

FIG. 40 shows illustrative LED mounting layout 4000. LED layout 4000 may correspond to arrangement A2400. Layout 4000 includes double weld spots for mounting LEDs. Weld spots marked as "A" are configured for a circuit to power a first string of LEDs. Weld spots marked as "B" are configured for a circuit to power a second string of LEDs. The first string may have LEDs of a first CCT. The second string may have LEDs of a second CCT. The first CCT may be 3,000° K. The first CCT may be 4,000° K. A power supply, a dimming circuit, a CCT mixing control and other components may be provided separately. Dielectric material between the LED mounting spaces may be absent or reduced in comparison to standard layouts. Space on the layout for those components may then be used for additional LEDs to increase uniformity of intensity incident on grains. The first and second strings may include, for example, parts SEOUL 3528 SAW9A62E-E2 HMCE 2790 3 and SEOUL 3528 SAW9A62E-E2 FMCE 3590 3, respectively.

The intensity variations and averages shown in FIG. 28 may apply analogously to arrangement 3500.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

All ranges and parameters disclosed herein shall be understood to encompass any and all subranges subsumed therein, every number between the endpoints, and the endpoints. For example, a stated range of "1 to 11" should be considered to include any and all subranges between (and inclusive of) the minimum value of 1 and the maximum value of 11; that is, all subranges beginning with a minimum value of 1 or more (e.g. 1 to 6.1), and ending with a maximum value of 11 or less (e.g., 2.3 to 10.4, 3 to 8, 4 to 7), and finally to each number 1, 2, 3, 4, 5, 6, 7, 8, 10, and 11 contained within the range.

Thus, methods and apparatus for enhanced lighting have been provided. Persons skilled in the art will appreciate that the present invention may be practiced by other than the described embodiments, which are presented for purposes of illustration rather than of limitation.

What is claimed is:

1. Apparatus comprising:

a light-emitting diode ("LED") light source that is configured to emit a pattern of light that has peaks of intensity that are spatially separated;

a diffuser that includes:

a first side facing the light source;

a second side opposite the first side;

a repetitive pattern;

a translucent body that is disposed in front of the LED light source;

adhesive; and a plurality of faceted grains that are fixed to the translucent body by the adhesive;

wherein, in operation, from the second side, more than one peak of intensity emerges for each peak of intensity in the pattern.

2. The apparatus of claim 1 wherein the translucent body includes glass.

3. The apparatus of claim 2 wherein the faceted grains are fixed to the translucent body by glue.

4. The apparatus of claim 1 wherein:

the light source includes an LED that is configured to emit a light beam that defines an axis; and the more than one peak of intensity that emerge from the second side are observable when viewed in a direction along the axis toward the LED.

5. The apparatus of claim 1 wherein the translucent body includes polymer.

6. The apparatus of claim 1 further comprising a light-transmissive body;

wherein the translucent body is disposed between the LED light source and the light-transmissive body.

7. The apparatus of claim 1 wherein the repetitive pattern includes facets.

8. The apparatus of claim 1 wherein the repetitive pattern includes a wave.

9. The apparatus of claim 8 wherein the translucent body includes glass.

10. The apparatus of claim 9 wherein the faceted grains are fixed to the translucent body by glue.

11. The apparatus of claim 1 wherein the translucent body is spaced apart from the LED light source by at least 4 millimeters.

12. The apparatus of claim 1 wherein the translucent body is spaced apart from the LED light source by no more than 30 millimeters.

13. The apparatus of claim 1 wherein the faceted grains are fixed to a face of the translucent body that faces the LED light source.

14. The apparatus of claim 13 wherein the translucent body includes glass.

15. The apparatus of claim 14 wherein the faceted grains are fixed to the translucent body by glue.

16. The apparatus of claim 1 wherein the faceted grains are fixed to a face of the translucent body that faces away from the LED light source.

17. The apparatus of claim 1 wherein the repetitive pattern is embodied in the translucent body.

18. The apparatus of claim 17 wherein the pattern is embodied in a face of the translucent body that faces the LED light source.

19. The apparatus of claim 18 wherein the repetitive pattern includes a wave.

20. The apparatus of claim 17 wherein the pattern is embodied in a face of the translucent body that faces away from the LED light source.

21. Apparatus comprising:

a light-emitting diode ("LED") light source;

a diffuser that includes a first body that is curved, translucent, and disposed in front of the LED light source;

adhesive; and a second body that transmits light;

wherein:

a plurality of faceted grains are fixed to the diffuser by the adhesive; and the diffuser is disposed between the LED light source and the second body.

22. The apparatus of claim 21 wherein the first body defines a dome.

23. The apparatus of claim 21 wherein the faceted grains are fixed to a convex surface of the diffuser.

24. The apparatus of claim 23 wherein the convex surface faces away from the LED light source.

25. The apparatus of claim 21 wherein the second body encloses:

the first body; and the LED light source.

26. The apparatus of claim 25 wherein the second body defines an aperture opposite the LED light source.

27. The apparatus of claim 26 wherein:

the aperture has, in a direction transverse to a central axis of the LED light source, a diameter; and second body has a corresponding diameter that increases with distance away from the aperture and toward the LED light source.

28. The apparatus of claim 27 wherein the second body includes an undulating pattern.

29. The apparatus of claim 25 wherein the LED light source is configured to produce a beam of light that is directed to propagate, concurrently, along:

a first path that traverses an aperture in the second body; and a second path that traverses the second body.

30. The apparatus of claim 21 wherein:

the second body is included in a lamp body;

the LED light source includes LEDs that are mounted on an LED board that is fixed in place by the lamp body; and the lamp body is free-standing.

* * * * *